(12) United States Patent
Karpel et al.

(10) Patent No.: US 10,552,530 B1
(45) Date of Patent: Feb. 4, 2020

(54) SPREADSHEET SHARED REGION AND CELL FORMULA TEMPLATING

(71) Applicant: Workday, Inc., Pleasanton, CA (US)

(72) Inventors: Leonard Karpel, Lyons, CO (US);
Brian Sean Morris, Boulder, CO (US);
Terry M. Olkin, Niwot, CO (US);
Sayan Chakraborty, Niwot, CO (US)

(73) Assignee: Workday, Inc., Pleasanton, CA (US)

( * ) Notice: Subject to any disclaimer, the term of this patent is extended or adjusted under 35 U.S.C. 154(b) by 444 days.

(21) Appl. No.: 14/825,003

(22) Filed: Aug. 12, 2015

(51) Int. Cl.
*G06F 17/24* (2006.01)
*G06F 17/27* (2006.01)
*H04L 29/08* (2006.01)
*H04L 29/06* (2006.01)

(52) U.S. Cl.
CPC ........ *G06F 17/246* (2013.01); *G06F 17/2705* (2013.01); *H04L 63/10* (2013.01); *H04L 67/1095* (2013.01)

(58) Field of Classification Search
CPC ......... G06F 17/30592; G06F 17/30123; Y10S 707/99931
See application file for complete search history.

(56) References Cited

U.S. PATENT DOCUMENTS

| | | | |
|---|---|---|---|
| 7,743,316 B2 * | 6/2010 | Bauchot | G06F 21/6227 715/212 |
| 8,108,464 B1 | 1/2012 | Rochelle | |
| 9,158,832 B1 | 10/2015 | Hiatt | |
| 9,270,647 B2 | 2/2016 | Call | |
| 2005/0091578 A1 | 4/2005 | Madan | |
| 2005/0188421 A1 * | 8/2005 | Arbajian | G06F 21/6254 726/4 |
| 2006/0020673 A1 | 1/2006 | Sorge | |
| 2007/0022368 A1 | 1/2007 | Bauchot | |
| 2007/0030528 A1 | 2/2007 | Quaeler | |
| 2007/0219956 A1 * | 9/2007 | Milton | G06F 17/246 |
| 2007/0220415 A1 | 9/2007 | Cheng | |
| 2008/0208880 A1 | 8/2008 | Dong | |

(Continued)

FOREIGN PATENT DOCUMENTS

EP 2343668 7/2011

OTHER PUBLICATIONS

C. Frye, Microsoft Excel 2013: Step by Step, published Mar. 31, 2014, selected excerpts.*

(Continued)

*Primary Examiner* — Jennifer N To
*Assistant Examiner* — Eric J Yoon
(74) *Attorney, Agent, or Firm* — Van Pelt, Yi & James LLP

(57) ABSTRACT

A system for spreadsheet region and cell sharing using formula templates includes a processor and an interface. The processor is to parse a formula of a first cell of a first spreadsheet document for a second cell, the first spreadsheet document being associated with a first user having a set of user access descriptors and to determine, based on the set of user access descriptors, whether the first user has access to one or more canonical names referenced in the formula. The interface is to provide display information to the first user either the canonical name in the event that the first user has access to the canonical name or an opaque identifier in the event that the first user does not have access to the canonical name.

18 Claims, 23 Drawing Sheets

(56) References Cited

U.S. PATENT DOCUMENTS

| | | | |
|---|---|---|---|
| 2008/0229184 A1* | 9/2008 | Prish | G06F 17/246 |
| | | | 715/212 |
| 2009/0172553 A1 | 7/2009 | Sikka | |
| 2010/0070930 A1 | 3/2010 | Thibault | |
| 2010/0145997 A1* | 6/2010 | Zur | G06F 21/6218 |
| | | | 707/783 |
| 2011/0088091 A1 | 4/2011 | Petronijevic | |
| 2012/0137203 A1 | 5/2012 | Schödl | |
| 2012/0151378 A1 | 6/2012 | Parish | |
| 2012/0330995 A1* | 12/2012 | Muenkel | G06F 17/246 |
| | | | 707/769 |
| 2013/0326020 A1* | 12/2013 | Bastide | H04L 51/32 |
| | | | 709/218 |
| 2014/0372855 A1 | 12/2014 | Myerscough | |
| 2015/0193492 A1 | 7/2015 | Gunaratne | |
| 2015/0309980 A1 | 10/2015 | Glass | |
| 2016/0019401 A1 | 1/2016 | Kumar | |

OTHER PUBLICATIONS

C. Frye, Microsoft Excel 2013: Step by Step, selected excerpts, published Mar. 2014 (Year: 2014).*

Singh et al. "Security policy analysis using deductive spreadsheets." In Proceedings of the 2007 ACM workshop on Formal methods in security engineering, pp. 42-50. ACM, 2007.

* cited by examiner

| | A | B | C | D | E | F |
|---|---|---|---|---|---|---|
| 1 | Cost Center | Owner | Headcount (Actual) | Headcount (Budgeted) | Variance | |
| 2 | 101 | Jones | 13 | 15 | 2 | |
| 3 | 102 | Smith | 47 | 40 | (7) | |
| 4 | 103 | Johnson | 32 | 32 | 0 | |
| 5 | 104 | Hanks | 12 | 13 | | |
| 6 | 105 | Cruise | 125 | 132 | | |
| 7 | 106 | Parker | 14 | 11 | | |
| 8 | 107 | Martin | 66 | 65 | | |
| 9 | | | | | | |
| 10 | | Totals | 309 | 308 | | |

Context menu (404):
- Cut
- Copy
- Paste
- Clear
- Merge
- Create Chart
- Share A1:E8

FIG. 4

|   | A | B | C | D | E |
|---|---|---|---|---|---|
| 1 | Cost Center | Owner | Headcount (Actual) | Headcount (Budgeted) | Variance |
| 2 | 101 | Jones | 13 | 15 | 2 |
| 3 | 102 | Smith | 47 | 40 | (7) |
| 4 | 103 | Johnson | 32 | 32 | 0 |
| 5 | 104 | Hanks | 12 | 13 | 1 |
| 6 | 105 | Cruise | 125 | 132 | 7 |
| 7 | 106 | Parker | 14 | 11 | (3) |
| 8 | 107 | Martin | 66 | 65 | (1) |
| 9 |   |   |   |   |   |
| 10 |   | Totals | 309 | 308 | (1) |
| 11 |   |   |   |   |   |

FIG. 5

|   | A | B | C | D | E | F | G | H |
|---|---|---|---|---|---|---|---|---|
| 1 |   |   |   |   |   |   |   |   |
| 2 |   |   |   |   |   |   |   |   |
| 3 |   |   | Cost Center | Owner | Headcount (Actual) | Headcount (Budgeted) | Variance |   |
| 4 |   |   | 101 | Jones | 13 |   | 15 | 2 |
| 5 |   |   | 102 | Smith | 47 |   | 40 | (7) |
| 6 |   |   | 103 | Johnson | 32 |   | 32 | 0 |
| 7 |   |   | 104 | Hanks | 12 |   | 13 | 1 |
| 8 |   |   | 105 | Cruise | 125 |   | 132 | 7 |
| 9 |   |   | 106 | Parker | 14 |   | 11 | (3) |
| 10 |   |   | 107 | Martin | 66 |   | 65 | (1) |
| 11 |   |   |   |   |   |   |   |   |

FIG. 14

The requested access has been denied.  Dismiss ~1601

FIG. 19

| | A | B | C | D | E | F | G | H | I | J |
|---|---|---|---|---|---|---|---|---|---|---|
| 1 | | | | | | | | | | |
| 2 | | | | | | | | | | |
| 3 | | | Cost Center | Owner | Headcount (Actual) | Headcount (Budgeted) | Variance | | | |
| 4 | | | 101 | Jones | 14 | 15 | 1 | | | |
| 5 | | | 102 | Smith | 47 | 40 | (7) | | | |
| 6 | | | 103 | Johnson | 32 | 32 | 0 | | | |
| 7 | | | 104 | Hanks | 12 | 13 | 1 | | | |
| 8 | | | 105 | Cruise | 125 | 132 | 7 | | | |
| 9 | | | 106 | Parker | 14 | 11 | (3) | | | |
| 10 | | | 107 | Martin | 66 | 65 | (1) | | | |
| 11 | | | | | | | | | | |
| 12 | | | | | 310 | | | | | |
| 13 | | | | | | | | | | |
| 14 | | | | | | | | | | |

Cell G4 formula: =@102405!D2-@102405!C2

1901, 1902, 1903 — "Shared in Read-Write"
1910

FIG. 20

| | A | B | C | D | E | F | G | H | I | J |
|---|---|---|---|---|---|---|---|---|---|---|
| 1 | | | | | | | | | | |
| 2 | | | | | | | | | | |
| 3 | | | Cost Center | Owner | Headcount (Actual) | Headcount (Budgeted) | Variance | | | |
| 4 | | | 101 | Jones | 14 | 15 | 1 | | | |
| 5 | | | 102 | Smith | 47 | 40 | (7) | | | |
| 6 | | | 103 | Johnson | 32 | 32 | 0 | | | |
| 7 | | | 104 | Hanks | 12 | 13 | 1 | | | |
| 8 | | | 105 | Cruise | 125 | 132 | 7 | | | |
| 9 | | | 106 | Parker | 14 | 11 | (3) | | | |
| 10 | | | 107 | Martin | 66 | 65 | (1) | | | |
| 11 | | | | | | | | | | |

Cell G10 formula: =!'Shared with Me'!'Budget'!'Sheet1'!D8-!'Shared with Me'!'Budget'!'Sheet1'!C8

Shared in Read-Write — 2003
2002
2001
2010

| | A | B |
|---|---|---|
| 9 | 10 | |
| 10 | =B10 | 40 |
| 11 | 30 | |
| 12 | =SUM(A9 : A11) | |

WS!S1!A9:B12

| | D |
|---|---|
| 8 | 10 |
| 9 | ='@98316'!B10 |
| 10 | 30 |
| 11 | =SUM('@98316'!A9: '@98316'!A11) |

| Mode Encoding | Description |
|---|---|
| 0 | Sheet Relative Addressing (i.e., The Object Resolves to the Local Sheet). |
| 1 | Workbook Relative Path Addressing (i.e., The Object Resolves to a Sheet in the Local Workbook). |
| 2 | Absolute Path Addressing (i.e., The Object is Resolved Starting at the User's Root Path Allowing Addressing to other Workbooks and Extra-Workbook Objects) |

SPREADSHEET SHARED REGION AND CELL FORMULA TEMPLATING

BACKGROUND OF THE INVENTION

Documents, including spreadsheets, have limitations in terms of how the underlying data in the document or spreadsheet is shared. Typically, a document, such as a spreadsheet, is shared by copying files containing the workbooks and providing a copy of the file to each person with whom the author wants to share the data. Sharing is done at the file level of granularity and each user works on a copy of the workbook. When a shared user modifies a copy of the workbook, the change exists only in that user's version of the workbook. Every user is granted complete access to and can view and/or modify their copy of the workbook. However, this is inconvenient as one user's changes are not available to the other users, so sharing involves sending updated copies around to each of the users.

In software as a service (SaaS) applications, multiple users can be granted access to a single workbook. The advantage being that each user that is granted access is able to view and/or modify essentially the same workbook. This enables all users to see each other's updates. In some cases, sharing can be granted at the sheet level, so that different users are granted permissions to view and/or modify a sheet of the workbook (e.g., a page of the workbook) instead of the entire workbook. However, in these cases, the users granted access to the workbook or sheet are still granted viewing and/or modifying permission for the entire workbook or sheet. In other words, in the event that a workbook is shared, then the entire workbook is viewable, and in the event that a sheet is shared, then the entire sheet is viewable. Any information that should not be available for viewing and/or modifying by the shared user cannot be placed in the workbook or sheet, which is often impractical and inconvenient.

BRIEF DESCRIPTION OF THE DRAWINGS

Various embodiments of the invention are disclosed in the following detailed description and the accompanying drawings.

FIG. 4 is a diagram illustrating an embodiment of a display of a spreadsheet document with region and cell sharing system.

FIG. 5 is a diagram illustrating an embodiment of a display of a spreadsheet document with region and cell sharing system.

FIG. 14 is a diagram illustrating an embodiment of a display for a user interface for placing a shared region in a workbook.

FIG. 19 is a diagram illustrating an embodiment of a display for a user interface for displaying an opaque identifier for a referenced cell.

FIG. 20 is a diagram illustrating an embodiment of a display for a user interface for displaying a canonical name of a shared cell.

FIG. 21 is a diagram illustrating embodiments of formula template reconstitution.

FIG. 22 is a table illustrating an embodiment of formula template addressing modes.

DETAILED DESCRIPTION

Figure 1:
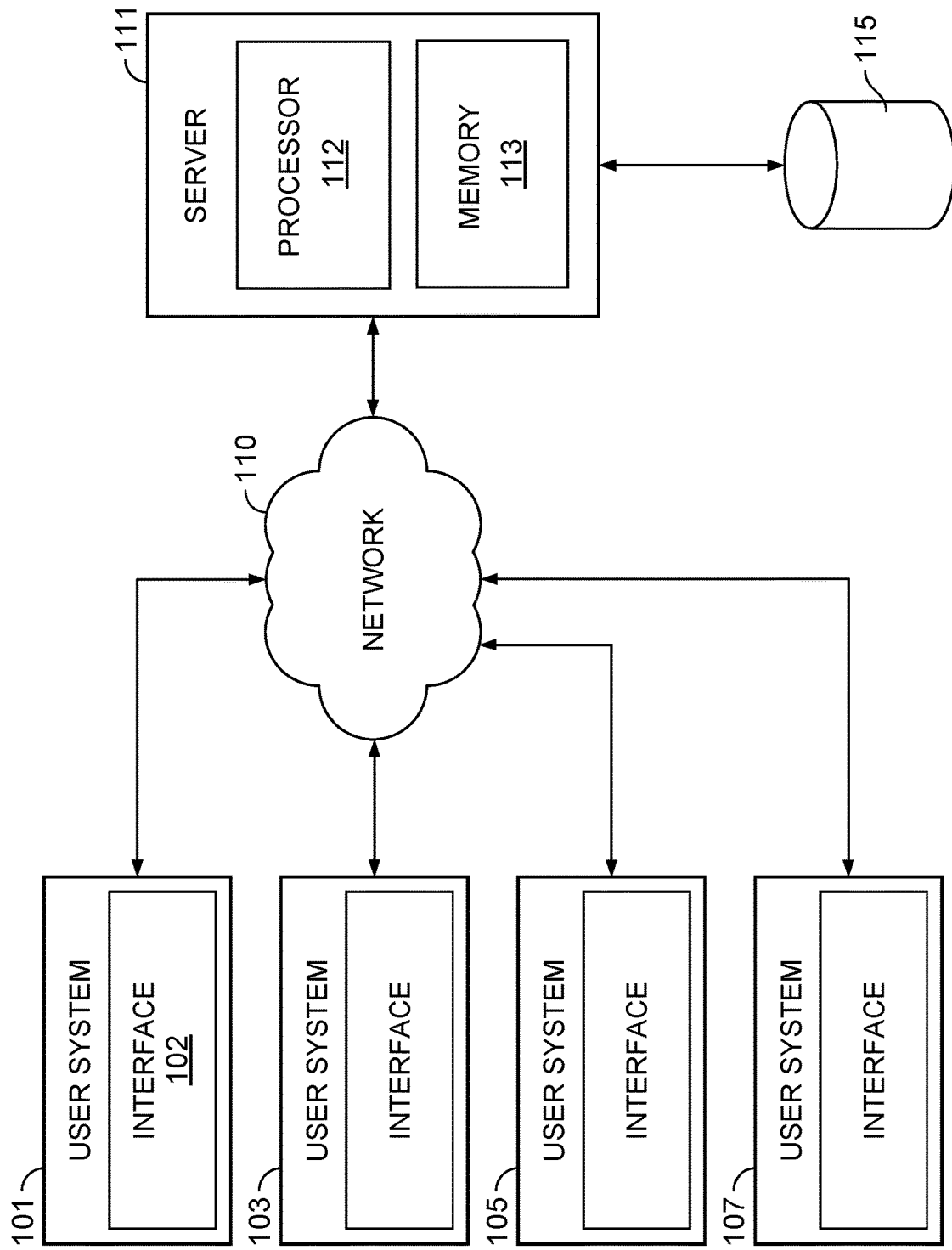
FIG. 1 is a block diagram illustrating an embodiment of a spreadsheet region and cell sharing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for spreadsheet region and cell sharing is disclosed. The system comprises an interface and a processor. The interface is to provide a display interface data for a spreadsheet document, receive a selected region of the spreadsheet document, and receive an access descriptor. The processor is to determine whether to enable access to the selected region based at least in part on the access descriptor. In some embodiments, the processor is coupled to a memory, which is configured to provide the processor with instructions.

A system for spreadsheet region and cell sharing permissions is disclosed. The system comprises an interface and a processor. The interface is to receive a request to display a subset of a spreadsheet. The processor is to determine whether to enable display access to the subset of the spreadsheet document based at least in part on a set of user access descriptors; provide data associated with the subset of the spreadsheet document for display in the event that display access is enabled; and provide an indication of access denial for display in the event that display access is not enabled. In some embodiments, the processor is coupled to a memory, which is configured to provide the processor with instructions.

A system for spreadsheet region and cell sharing is disclosed. The system comprises an interface and a processor. The interface is to receive an indication to modify a first cell of a first document, wherein a first user is associated with the first document and with a first set of user access descriptors. The processor is to determine whether the first user has write permission for the first cell based on the first set of user access descriptors; and in the event that the first user has write permission: indicate a modification to a location in a database storage location referenced by a pointer formula associated with the first cell and modify a second cell in a second document based on a dependency graph, wherein the second document is associated with a second user different from the first user. In some embodiments, the processor is coupled to a memory, which is configured to provide the processor with instructions.

A system for spreadsheet region and cell sharing using formula templates is disclosed. The system comprises an interface and a processor. The processor is to parse a formula of a first cell of a first spreadsheet document for a second cell, the first spreadsheet document being associated with a first user having a set of user access descriptors and determine, based on the set of user access descriptors, whether the first user has access to one or more canonical names referenced in the formula. The interface is to provide display information to the first user either the canonical name in the event that the first user has access to the canonical name or an opaque identifier in the event that the first user does not have access to the canonical name. In some embodiments, the processor is coupled to a memory, which is configured to provide the processor with instructions. In some embodiments, the formula of a first cell (associated with a first workbook, first sheet, and first user) is shared with a second cell, and the formula is interpreted for the second cell, its associated workbook, its sheet, and its user.

In some embodiments, a cell or cells of a spreadsheet are able to be shared between users. The sharing user selects a cell or cells to share and indicates whom to share it with and what permissions the shared user has (e.g., read only, read, write, modify, delete, insert, etc.). The shared user receives an indication that a cell or cells are being shared and that user can place them in a workbook of his own. The cell or cells are coupled to one another and both the sharing user and the shared user view the same values. A modification (in the event that modification is permitted) of the data changes data for both users. The cell or cells are indicated to be shared (e.g., by visual indication on, near, when hovering, in a separate listing, etc.). The sharing system takes care to show only the shared data; names or values are substituted with alternate names or values to hide non-shared information (e.g., sheet names, sheet locations, etc.).

In some embodiments, the system enables the sharing of a cell or region of cells within a document hosted on a software as a service (SaaS) platform. In some embodiments, the sharing includes a shared user writing a value in the cell or cells shared by the sharing user. For example, the system receives an indication to modify a cell of a document. A shared user and a set of shared user access descriptors are associated with the document. A determination of whether the shared user has write permission for the cell is made based on the set of shared user access descriptors. In the event the shared user has write permission, an indication is made to modify a location in a database storage location referenced by a pointer formula associated with the cell. A modification of another cell in another document (e.g., a second document) based on a dependency graph is made wherein the other document (e.g., the second document) is associated with a second user (e.g., the sharing user or original user that shared a cell) different from the shared user. The pointer formula indicates a link between the cell and the other cell of the other document that is the source of the value, the data, or the formula for the cell. The dependency graph describes the links between a source cell and all shared locations. In some embodiments, a dependency graph describes links between a cell and cells linked by a calculation or other formula. In some embodiments, the modification of a shared cell is as follows:

1. check permissions;
2. in the event that the shared user has write permission, then use the pointer formula to locate the "original" cell;
3. write the modification (i.e., the new value) to the original cell; and
4. use the dependency graph to determine all other cells that are supported by this one (i.e., whose formulas depend on the original cell); Each of those cells has a formula which is then re-evaluated; In the case of a shared cell, it is the pointer formula that is re-evaluated resulting in the new value that was written into the original cell to appear as the value in the shared cell.

In some embodiments, sharing a document hosted on a SaaS platform includes the sharing of a spreadsheet document at a cell granularity with other users. In a spreadsheet document, the document comprises one or more workbooks. Each workbook in turn comprises one or more sheets. Each sheet contains a table of cells. The table of cells may be arranged in a grid. In the following example, a spreadsheet cell or a region of cells may be shared with other users without sharing the entire document, workbook, or sheet. As an example, a user (e.g., a first or original user) creates a spreadsheet document. The user has a set of user access descriptors associated with each cell of the document. The user can then select a cell or region of cells to share with a shared user (e.g., a second user different from the first or original user). The shared user may include the shared cells in a second document, which has a corresponding set of shared user access descriptors for the second user. When the shared user modifies a cell that is shared by the first or original user, the SaaS platform receives an indication that a user is attempting to modify the contents of a shared cell and determines whether the author of the change has the appropriate permission to modify the cell based on the author's user access descriptors. In the event that the author has write permission, an indication is made to modify a location in a database storage location of the SaaS platform. This location corresponds to the contents of the shared cell and is determined by a pointer formula associated with the modified cell. The SaaS platform relies on a dependency graph to determine what other documents include the shared cell and propagates the change to those shared cells.

In some embodiments, the formula for a shared cell is displayed within a document based on the user access descriptors of the shared user. The displaying includes parsing the formula of a first cell of a spreadsheet document for a second cell of either the same spreadsheet document or another spreadsheet document associated with a shared user. In some embodiments, the formula of the first cell (associated with a first workbook, first sheet, and first user) is shared with a second cell, and the formula is interpreted for the second cell, its associated workbook, its sheet, and its user. The spreadsheet document is associated with a first user (e.g., the user that shares the cell) having a set of user access descriptors. The spreadsheet document or another spreadsheet document is associated with the shared user having a set of shared user access descriptors. A determination is made, based on the set of shared user access descriptors, whether the shared user has access to one or more canonical names referenced in the formula. In the event that the shared user has access to the canonical name then a canonical name is displayed to the shared user. In the event that the shared user does not have access to the canonical name, a corresponding opaque identifier is displayed to the shared user.

In some embodiments, displaying formulas for a spreadsheet document hosted on a SaaS document platform includes the displaying of a formula for a shared cell based on the user access descriptors of the shared user. A formula for a shared cell may reference another cell including another cell in a different document, workbook, or sheet. When displaying the formula for a shared cell, the formula for the shared cell is parsed for references to other cells. Based on the user's access descriptors, if the user has access to the canonical names associated with the referenced cell, such as the workbook and sheet names, then the canonical names are displayed in the formula. In the event the user does not have access to the canonical names associated with the referenced cell, an opaque identifier is substituted in place of the canonical names. In some embodiments, a table mapping between opaque identifiers and canonical names is stored and used to look up a canonical name for a given opaque identifier or vice versa. In some embodiments, a canonical name is associated with an object, and a unique object identifier is used to determine an opaque identifier (e.g., the opaque identifier is based at least in part on the object identifier). In some embodiments, the system uses an object identifier derived from an opaque identifier to locate an object of interest (e.g., parsing the opaque identifier to derive an object identifier that is used to identify a location for the stored object and retrieving a value, a formula, etc. from that stored object).

In some embodiments, user access is determined to a shared cell or a region of shared cells within a document hosted on a software as a service (SaaS) platform. The determination includes whether to display access to a subset of a spreadsheet document based at least in part on a set of user access descriptors. In the event that display access is enabled, data associated with the subset of the spreadsheet document for display is provided. In the event that display access is not enabled, an indication of access denial for display is provided.

In some embodiments, user access levels for a spreadsheet document hosted on a SaaS platform include determining whether to allow a user to view the contents of a subset of a spreadsheet document based on a set of the user's user access descriptors. When display access is enabled, the SaaS platform provides the underlying data associated with the subset of the spreadsheet document so that the data can be rendered in the particular user's user interface client for the user to view. When display access is not enabled, the SaaS platform provides a message data for displaying an access denied message to the user.

In some embodiments, a display interface data is provided to enable the sharing of a cell or region of cells within a document hosted on a software as a service (SaaS) platform. A spreadsheet document is hosted. Display interface data is provided for the spreadsheet document. A selected region of the spreadsheet document and an access descriptor is received. A selected region of the spreadsheet document and an access descriptor associated with the spreadsheet document is stored. A determination is made whether to enable access to the selected region based at least in part on the access descriptor.

In some embodiments, providing display interface data for a SaaS document platform includes providing the display interface data to create a client user interface for the spreadsheet document in a web browser for sharing a cell or region of cells. A region of the spreadsheet document that is intended to be shared is selected along with an access descriptor. Examples of an access descriptor include a shared region's name, the name of a shared user, and sharing permissions. The selected region is stored with the access descriptor associated with the spreadsheet. Based on the access descriptor, the user interface is created with functionality that corresponds to either allowing or not allowing access to the selected region.

FIG. 1 is a block diagram illustrating an embodiment of a spreadsheet region and cell sharing system. In the example shown, application server 111 includes processor 112 and memory 113. Application server 111 is coupled to external storage 115 so that application server 111 is able to store information to and access information from external storage 115. In various embodiments, external storage 115 comprises a database, a cluster of databases, a hard disc, a redundant array of discs, or any other appropriate storage hardware. Application server 111 is also coupled to network 110. In various embodiments, network 110 comprises one or more of the following: a local area network, a wide area network, a wired network, a wireless network, the Internet, or any other appropriate network or combination of networks. User system 101, user system 103, user system 105, and user system 107 access application server 111 via network 110. In some embodiments, user system 101, user system 103, user system 105, and user system 107 access an application running on application server 111 (e.g., a spreadsheet document application). In some embodiments, a spreadsheet application presents a spreadsheet based on stored data, where at least a portion of the data is stored in external storage 115. In some embodiments, the data stored on external storage 115 is spreadsheet data and metadata. User system 101 contains a user interface 102 used to access application server 111. In some embodiments, user interface 102 is used to access an application running on application server 111. In some embodiments, user interface 102 relies on a web browser to access a spreadsheet application running on application server 111.

In various embodiments, application server 111 comprises one or more physical servers with one or more processors, one or more memories, and one or more other storage devices (e.g., hard drives, array of drives, etc.) and/or one or more virtual environments (e.g., virtualization of operating system or application processes) in which an application is executed. In some examples, application server 111 comprises one or more servers that are part of a software as a service (SaaS) platform.

Figure 2:
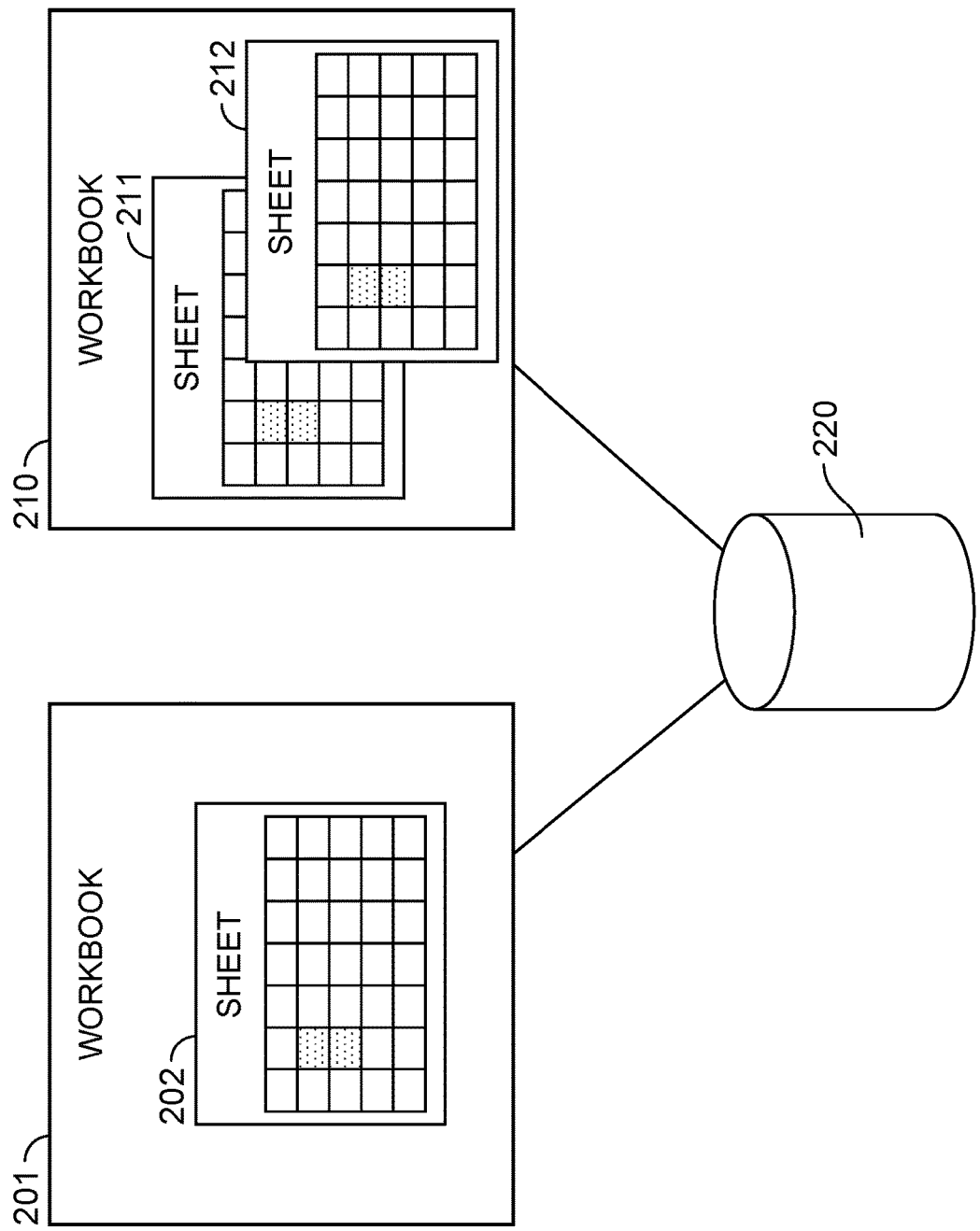
FIG. 2 is a block diagram illustrating an embodiment of a spreadsheet region and cell sharing system.

FIG. 2 is a block diagram illustrating an embodiment of a spreadsheet region and cell sharing system. In some embodiments, the system of FIG. 2 comprises a spreadsheet application executing on application server 111 of FIG. 1. In some embodiments, workbooks 201 and 210 are hosted on application server 111 of FIG. 1. In some embodiments, external storage 220 utilizes external storage 115 of FIG. 1. In the example shown, workbook 201 and workbook 210 are two different spreadsheet documents. Workbook 201 includes a single sheet 202. Workbook 210 includes sheet 211 and sheet 212. The data corresponding to workbook 201 and workbook 210, including the data in sheet 202, sheet 211, and sheet 212, are stored in external storage 220. In various embodiments, external storage 220 comprises a remote database, database cluster, or any other appropriate data storage device or system.

Figure 3A:
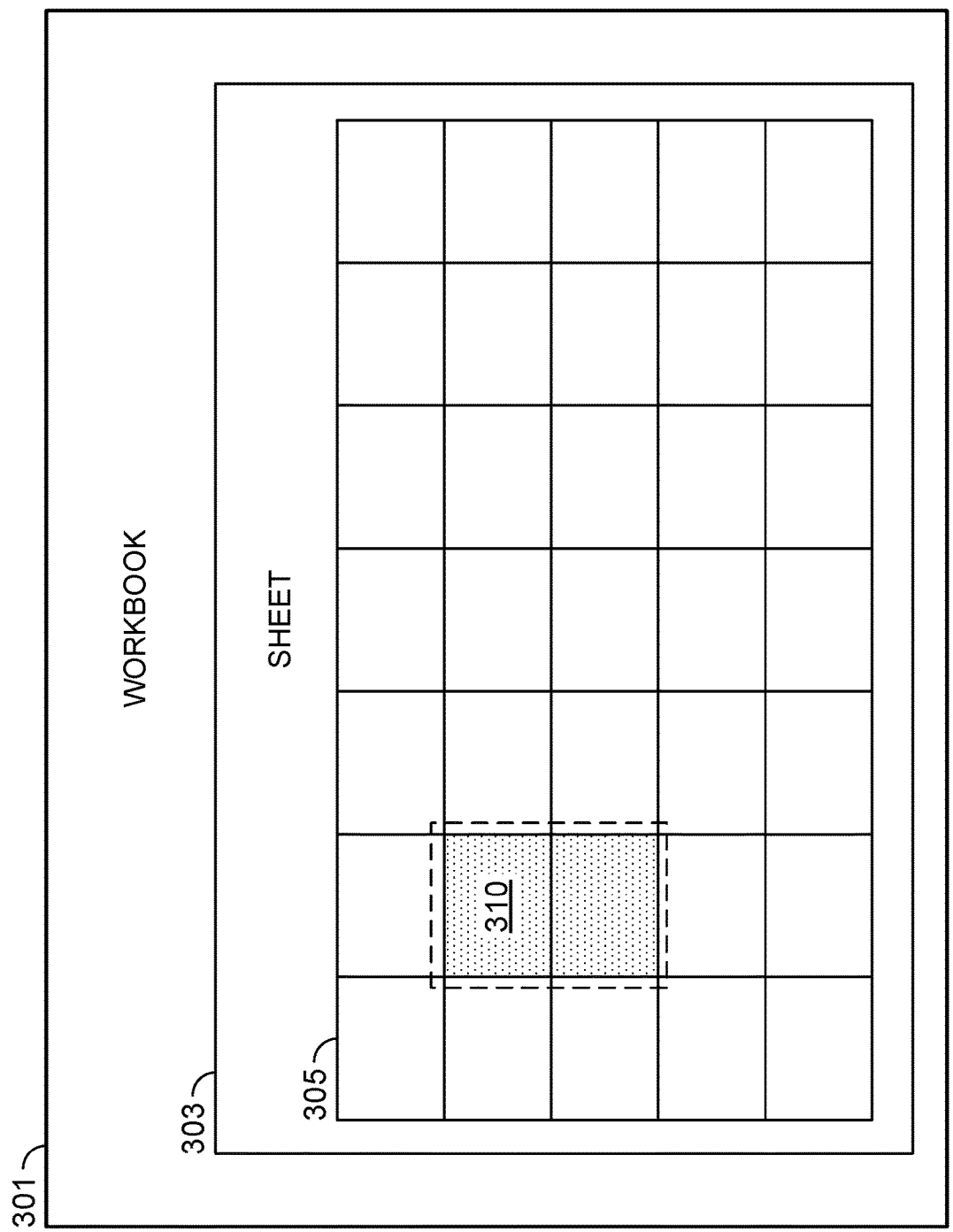
FIG. 3A is a block diagram illustrating an embodiment of a spreadsheet document with regions of cells.

FIG. 3A is a block diagram illustrating an embodiment of a spreadsheet document with regions of cells. In some embodiments, workbook 301 is hosted on application server 111 of FIG. 1. In some embodiments, workbook 301 comprises workbook 201 and/or workbook 210 of FIG. 2. In the example shown, workbook 301 includes a sheet (e.g., sheet 303) of a spreadsheet document. Workbooks include one or more sheets. Sheet 303 includes a table of cells 305. Table of cells 305 is arranged in a grid. Table of cells 305 contains a region (e.g., region 310). In some embodiments, region 310 is shared with one or more other users.

Figure 3B:
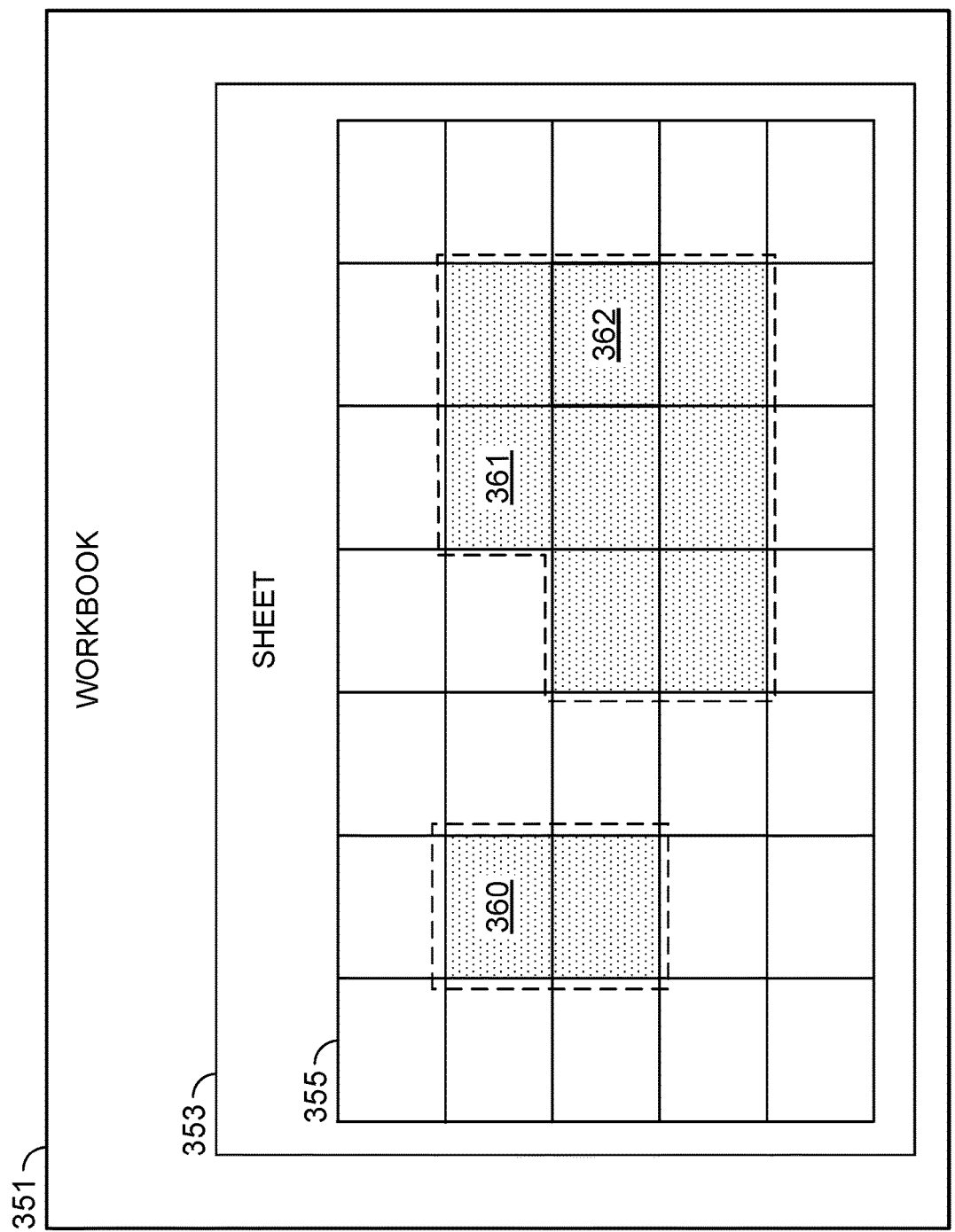
FIG. 3B is a block diagram illustrating an embodiment of a spreadsheet document with regions of cells.

FIG. 3B is a block diagram illustrating an embodiment of a spreadsheet document with regions of cells. In some embodiments, workbook 351 is hosted on application server 111 of FIG. 1. In some embodiments, workbook 351 comprises workbook 201 and/or workbook 210 of FIG. 2. In the example shown, workbook 351 includes a sheet (e.g., sheet 353) of a spreadsheet document. Workbooks include one or more sheets. Sheet 353 includes a table of cells 355. Table of cells 355 is arranged in a grid. Table of cells 355 contains two regions (e.g., region 360 and region 361). A region of cells can be both rectangular and non-rectangular. Region 360 is a rectangular region (e.g., a region made up of two cells—one cell above another cell). Region 361 is a non-rectangular region (e.g., three cells tall and three cells wide with top left cell omitted). Cell 362 is a single cell that exists in workbook 351, sheet 353, table 355, and region 361. In various embodiments, region 360 and/or region 361 is/are shared with one or more other users.

FIG. 4 is a diagram illustrating an embodiment of a display of a spreadsheet document with region and cell sharing system. In some embodiments, the display of FIG. 4 is a display of a workbook executing as an application on application server 111 of FIG. 1. In some embodiments, table 401 comprises table 305 of FIG. 3A. In the example shown, table 401 is a table of cells in a sheet of a workbook. Region 402 is a region of selected cells of table 401. Region 402 includes cells that make up a rectangular collection of cells from cell A1 to cell E8. Cell 403 is a cell within region 402. A user is able to select one or more cells that make up a region. Region 402 is selected by the user as indicated in the display by a surrounding dashed line of the selected region. In some embodiments, the selection is done by dragging a cursor across one or more cells while depressing a button of the cursor interface (e.g., a mouse, touchpad, etc.). User interface menu 404 displays actions that the user can perform on region 402. In some embodiments, user interface menu 404 is displayed in the event that the user right clicks on a button of the cursor interface (e.g., a mouse, touchpad, etc.) at a time when region 402 is selected. User interface menu 404 includes a share action 405. When selected by the user, share action 405 initiates the process of sharing region 402. In a similar manner, the user can initiate other exemplary actions present in user interface menu 404 such as cut, copy, paste, clear, merge, and create chart. In various embodiments, a selected region comprises one or more of the following: a rectangular region, a non-rectangular region, a region with adjacent cells, a region with non-adjacent cells, a set of cells with adjacent cells and non-adjacent cells, or any other appropriate set of cells.

FIG. 5 is a diagram illustrating an embodiment of a display of a spreadsheet document with region and cell sharing system. In some embodiments, the display of FIG. 5 is a display of workbook executing as an application on application server 111 of FIG. 1. In some embodiments, user interface menu 510 is invoked by selecting share action 405 of FIG. 4. In some embodiments, table 501, region 502, and cell 503 comprise table 401, region 402, and cell 403, respectively. In the example shown, table 501 comprises a table of cells in a sheet of a workbook. Region 502 is a region of selected cells of table 501. Region 502 comprises cells that make up the rectangular collection of cells from cell A1 to cell E8. Cell 503 is a cell within region 502. Region 502 is selected by the user as indicated in the display by a surrounding dashed line of the selected region. User interface menu 510 displays an interface for naming region 502 (e.g., by displaying a text entry field for a user) and proceeding with sharing region 502 (e.g., by presenting a 'share' button for a user to indicate proceeding with sharing). User interface menu 510 is invoked by a user in order to name the selected region and proceed with sharing the region. Text field 511 is a text entry field that enables a user to enter a name to associate with region 502. Share button 512 is a button that enables a user to proceed with sharing region 502.

Figure 6:
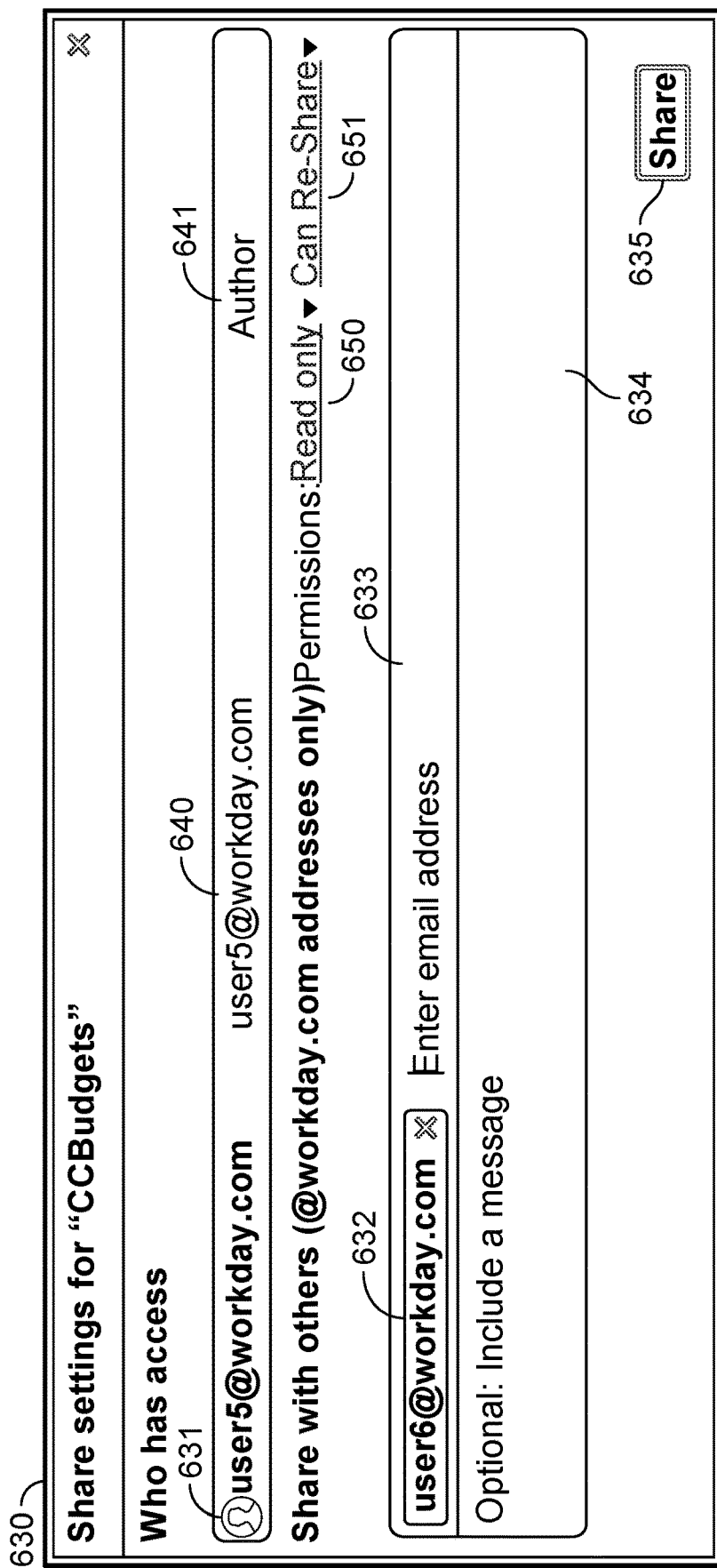
FIG. 6 is a diagram illustrating an embodiment of a display for a user interface enabling selecting users with whom a region of cells is to be shared.

FIG. 6 is a diagram illustrating an embodiment of a display for a user interface enabling selecting users with whom a region of cells is to be shared. In some embodiments, the display of FIG. 6 is displayed following a user indicating to proceed with sharing using share button 512 of FIG. 5. In the example shown, user interface window 630 is displayed to allow the user to select one or more users with whom to share a selected region. User interface window 630 includes information corresponding to current users that have access to the region. For each shared user, user interface window 630 includes information corresponding to the shared user including a user identifier, user email address, and user access status. For example, user interface window 630 includes user identifier 631 (e.g., user5@workday.com), user email address 640 (e.g., user5@workday.com), and user access status 641 (e.g., author). Author of the shared region indicates the user who created the workbook in which the shared region belongs. In some embodiments, user interface window 630 contains users who are not the author that were invited by the author to share the region. In various embodiments, user access status 641 includes an indication of one or more of the following: a read and/or write permission, a re-share permission, a share removal action, or any other appropriate permission or share action. User interface window 630 includes invitation field 633 for entering user identifier (e.g., user6@workday.com) with whom to share the region. The user is able to set access permissions for invitees using access permissions setting menu 650. In various embodiments, access permissions for a region include read access, read/write access, or any other appropriate access. The user is enabled to set re-share permissions for invitees using re-share permissions setting 651. In various embodiments, re-share permissions for a region include enabling re-sharing, disabling re-sharing, or any other appropriate re-share permissions. Share button 635 comprises a button that enables a user to indicate that the user desires to proceed with sharing the region with the users entered into invitation field 633 with the user access status corresponding to the settings in access permissions setting 650 and re-share permissions setting 651. In some embodiments, share button 635 is able to be activated only in the event that the appropriate user details are entered into invitation field 633. For example, in the event that no user is included in invitation field 633, share button 635 is not able to be selected. Message field 634 allows a user to enter a message that is sent to each newly invited user identified in invitation field 633 in the event that share button 635 is activated by a user.

Figure 7:
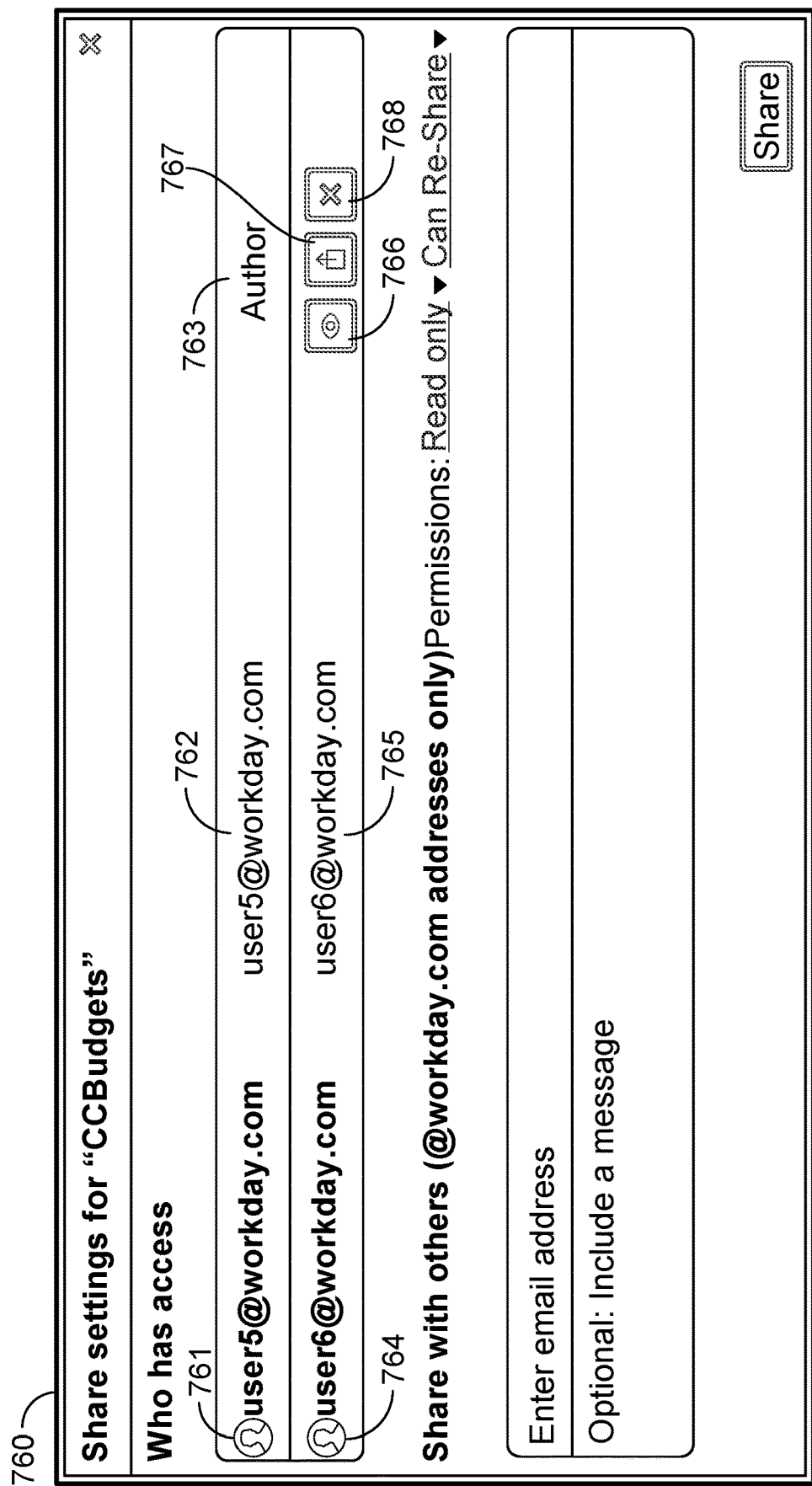
FIG. 7 is a diagram illustrating an embodiment of a display for a user interface for managing users with whom a region of cells is shared.

FIG. 7 is a diagram illustrating an embodiment of a display for a user interface for managing users with whom a region of cells is shared. In some embodiments, user interface of FIG. 7 manages users after users have been added using user interface of FIG. 6. In some embodiments, shared region is region 402 of FIG. 4 or region 502 of FIG. 5. In some embodiments, user interface window 760 is invoked by selecting share button 512 of FIG. 5. In some embodiments, user interface window 760 is invoked by selecting share button 635 of FIG. 6 to show newly invited users along with existing shared users. In some embodiments, access permissions setting 650 of FIG. 6 is used to set the initial value of the access permissions icon 766. In some embodiments, re-share permissions setting 651 of FIG. 6 is used to set the initial value of re-share permissions icon 767. In the example shown, user interface window 760 is displayed to enable a user to manage the users with whom a selected region is shared. Using user interface window 760, a user is able to add users with whom to share the region, remove users who already have access to the region, and change a user's access status. User interface window 760 includes information corresponding to the current users that have access to the region—for example, two shared users are displayed, one corresponding to the author and one to an invited shared user. Information corresponding to the author of the selected region includes user identifier 761, which has the value user5@workday.com; user email address 762, which has the value user5@workday.com; and user access status 763, which has the value author. Information for invited user user6@workday.com includes user identifier 764, which has the value user6@workday.com; user email address 765, which has the value user6@workday.com; access permissions icon 766; re-share permissions icon 767; and remove user icon 768. The user access permissions icon 766 displayed corresponds to read-only access. In some embodiments, an icon indicates read/write access (not shown in FIG. 7). The share permissions icon 767 displayed corresponds to re-sharing permissions enabled. In some embodiments, an icon indicates re-share permissions disabled (not shown). The user is enabled to remove a user using remove icon 768 from having share access to the region. In some embodiments, a user is able to manage access permissions and share permissions of invited users by selecting access permissions icon 766 and share permissions icon 767, respectively.

Figure 8:
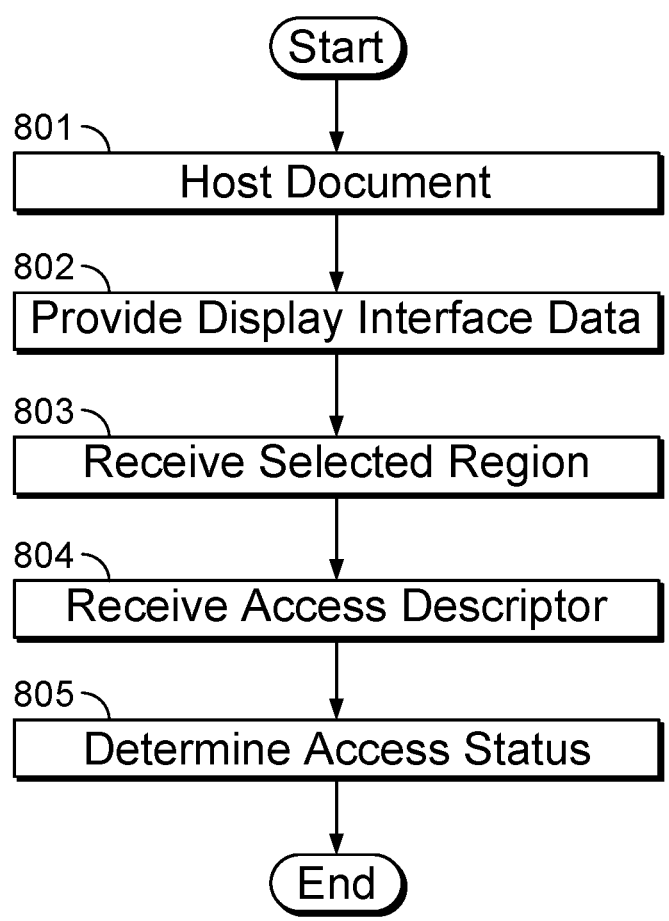
FIG. 8 is a flow diagram illustrating an embodiment of a process for determining access status for a shared region.

FIG. 8 is a flow diagram illustrating an embodiment of a process for determining access status for a shared region. In some embodiments, the process of FIG. 8 is executed using application server 111 of FIG. 1. In some embodiments, the process of FIG. 8 is used to create a client user interface for sharing a region of cells (e.g., user interfaces shown in FIGS. 4-7). In the example shown, in 801, a document is hosted. For example, a document, such as a spreadsheet document, is hosted. In some embodiments, the document is hosted on a single server or on a SaaS platform. In some embodiments, a user logs in via a user interface client in order to access the hosted document. In various embodiments, logging into the user interface client comprises entering a username and password into a terminal or other prompt, entering a URL into a Web browser, executing an application, or any other appropriate method of logging into the user interface client. In 802, display interface data is provided. For example, display interface data is provided to render a web page on a Web browser. In 803, a selected region is received. For example, a user selects a region using a user interface (e.g., a cursor and a graphical display, by highlighting, a text input of cell names, using row/column addresses, etc.). In various embodiments, the selected region comprises a single cell, a plurality of cells, a rectangular set of cells, a non-rectangular set of cells, an adjacent set of cells, a non-adjacent set of cells, all on the same sheet, cells on different sheets, or any other appropriate set of cells. In 804, an access descriptor is received. For example, an indication is received from a user of access permissions for a region being shared for a user that is being enabled to share access to the region. In some embodiments, the access descriptor includes a user identifier (e.g., a user email address, a login name, a system ID, an employer ID, etc.). In some embodiments, the access descriptor includes user access permissions (e.g., read only permission, read permission, read/write permission, modify permission, edit permission, delete permission, re-share permission, share removal permission, etc.). In some embodiments, the access descriptor includes a user address that is used to notify the user (e.g., a user email address, a login name, a system ID, an employer ID, etc.). In 805, access status is determined. For example, the system determines whether to enable a user access to the shared region based at least in part on the access descriptor.

In some embodiments, a selected region is stored in an external storage location and includes storing a region name associated with the selected region.

In some embodiments, once a determination is made regarding granting access, a notification is sent to the invited user notifying the invited user of the change in access permissions (e.g., a notice granting access, a notice of denying access, etc.). For example, the invitee receives an email notifying the user that a region with a region name has been shared with him or her. In some embodiments, a request to access the selected region is received. For example, the user granted access to the region indicates to access the shared region from a user interface client (e.g., a link to a user interface is selected by the user that is provided in the email notification indicating a granting of access, where the user interface comprises a menu enabling the user to insert the shared region of cells into a current or new sheet of a workbook).

Figure 9:
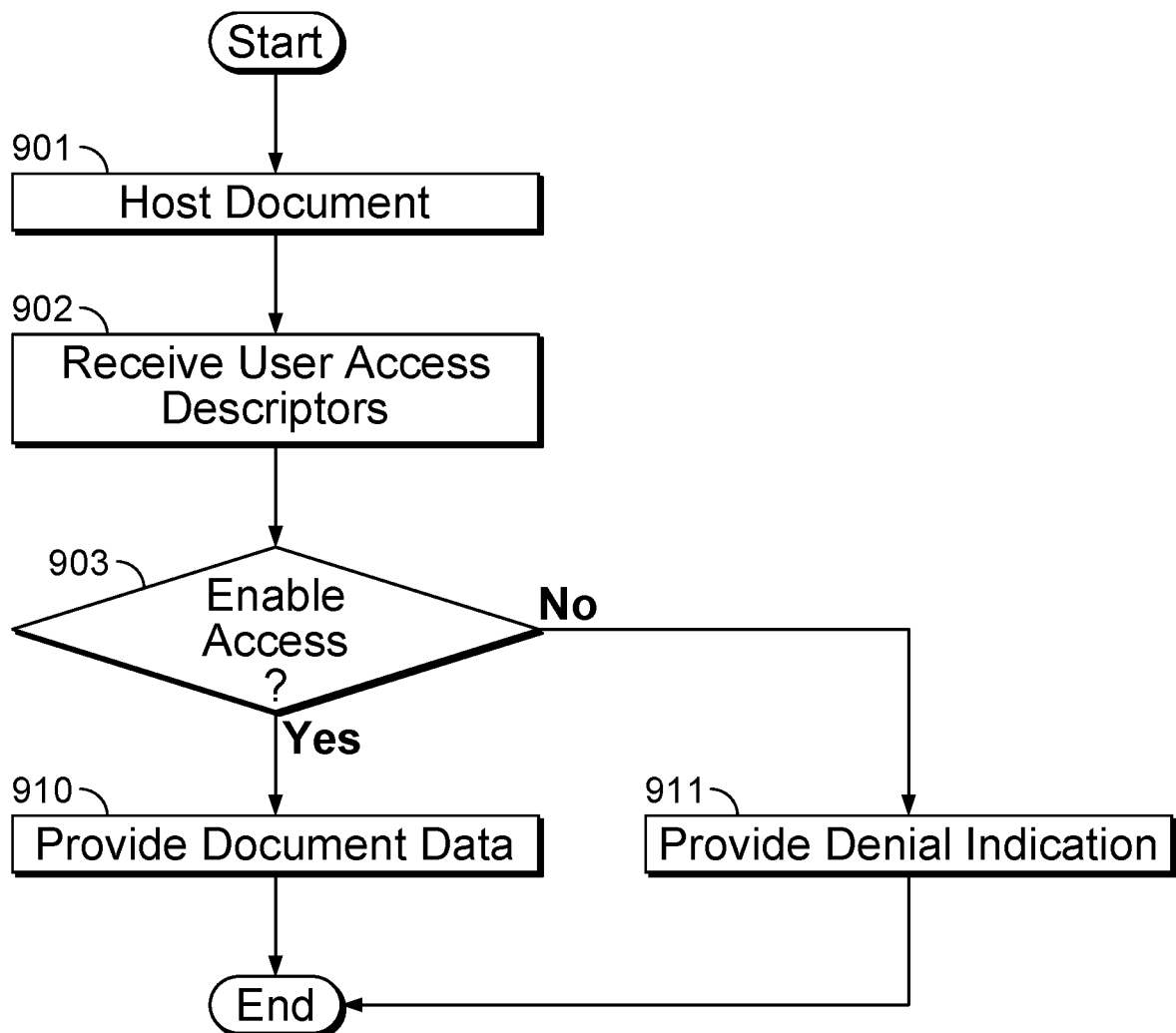
FIG. 9 is a flow diagram illustrating an embodiment of a process for modifying access permissions to a shared region of cells.

FIG. 9 is a flow diagram illustrating an embodiment of a process for modifying access permissions to a shared region of cells. In some embodiments, the process is executed by an application running on an application server 111 of FIG. 1. In the example shown, in 901, a document such as a spreadsheet document is hosted. For example, the document is hosted on a system for sharing a region of cells (e.g., a spreadsheet application is hosted on a single server or on a SaaS platform) that is accessed by a user. In some embodiments, a user accesses the system by logging in via a user interface client in order to access the hosted document. In various embodiments, logging into the user interface client comprises entering a username and password into a terminal or other prompt, entering a URL into a Web browser, executing an application, or any other appropriate method of logging into the user interface client. In 902, user access descriptors are received. For example, one or more user access descriptors are received via a user interface client from the author of the document to modify a shared user's access permissions to a selected region. The user access descriptors may grant or restrict access permissions. In some embodiments, a user access descriptor exists that corresponds to display access to the shared region. In some embodiments, a user access descriptor exists that corresponds to modify access to the shared region. In 903, it is determined whether access is enabled. For example, a determination is made whether access is enabled to the invitee based in part on a set of user access descriptors. In the event that access is enabled, then in 910 document data is provided. For example, data associated with the shared region is provided for display to the user. As another example, an owner user grants display access permission to a user for a shared region, and the user indicates to view the shared region (e.g., by indicating to place the shared region in a current or a new workbook), then the user is provided with document data to display the shared region. In the event that access is not enabled, then in 911 an indication of denial is provided. For example, in the event that the user does not have the correct share permissions, display access is not enabled to the invitee user and an indication of denial is displayed to the user (e.g., no display information is provided, a notification of denial of access is provided, etc.). In some embodiments, a determination is made separately for display access and for modify access. For example, modify access is enabled to an invitee only in the case that the user's access permissions includes read/write permission and the set of user access descriptors corresponds to a request for granting modify access to an invitee. In some embodiments, in the event that modify access is not enabled, the user is provided with an indication of access denial for modification. In some embodiments, the user access descriptors associated with the author, invitee, hosted document, and shared region are modified. In some embodiments, the user access descriptors are stored with data associated with the hosted document. In some embodiments, the user access descriptors are linked to a user (e.g., the author of the document, the invited user, etc.). In some embodiments, modifications to access permissions are stored in an externally hosted location from the system.

In some embodiments, user access descriptors received in 902 include both access granting permissions and/or access restricting permissions. By joining multiple user access descriptors, an author can grant certain permissions and restrict others to a shared region. In some situations, access permissions are represented as a restriction rather than a grant (e.g., a disable write permission).

In some embodiments, access permissions corresponding to the user access descriptors received in 902 are arranged in a hierarchical manner. For example, access descriptors at a higher level in a hierarchy are a superset of permissions granted to access descriptors at a lower level in the hierarchy. When permissions associated with a higher level in the hierarchy conflict with permissions associated with a lower level in the hierarchy, the higher level permissions override the lower level ones. In some embodiments, permissions must exist at all assigned levels in the hierarchy in order for the invitee to have the permission enabled. In some embodiments, when permissions associated with a finer granularity of data conflict with permissions associated with a coarser granularity of data, the permissions associated with the finer granularity override the coarser granularity ones. For example, in the event that a user is granted read access to a workbook but read/write access to shared cells of the same workbook, the shared cells have the permissions associated with the finer granularity of data, that is, the permissions associated with the shared cells. In some embodiments, for a spreadsheet document granularity of data from coarse to fine comprises group of workbooks, workbook, sheet, large region within one sheet, small region within a large region, cell within region. For example, for permissions based on granularity a manager shares a workbook with his direct reports granting read only access. The manager then shares different regions of the workbook with each direct report, the different regions corresponding to the regions that each direct report is responsible for. Each direct report is granted read/write permission only for the shared region they have access to. In this manner, the shared region permissions override the workbook permissions and each direct report can view the entire workbook but can only modify the shared regions that he or she has access to.

In some embodiments, the user access descriptors received in 902 include role-based permissions. Using role-based permissions, each role has associated with it certain access permissions. As an example, using a role-based permission policy, some roles have read/write access while others only have read access. For example, a "manager role" has read/write permissions while a "guest" role only has read permission. In some embodiments, multiple roles are assigned and the determination on whether to enable access is based on a union of the permissions. In some embodiments, the determination on whether to enable access is based on an intersection of the permissions.

In some embodiments, a process for sharing a region of cells is as follows. A team's financial budget is tracked using multiple spreadsheet documents. A master spreadsheet includes all the budget line items for the entire team. The CFO is the master spreadsheet owner and shares each budget line item, for example, a particular row, with the manager of that budget item. This is accomplished by selecting regions corresponding to each budget item and sharing that region with the corresponding manager with both read and write permissions. In this manner, only the CFO and the manager of a particular budget item is able to see and modify the value for that particular budget item. In some embodiments, a manager places the region corresponding to the manager's budget item into the manager's own spreadsheet document. This allows each manager to work directly on his or her budget item without divulging other managers' budget items or allowing other managers to change the values they do not manage. Changes made by each manager in his or her own spreadsheet are propagated to the master spreadsheet using the shared regions. Anytime a manager makes a change to a budget item that exists in his or her shared region, the CFO is able to see the update in real-time on the master spreadsheet. The CFO does not have to manually assemble the collection of changes from each manager back into the master spreadsheet. Whenever the CFO makes a change in the master spreadsheet, the changes that impact each manager are updated in real-time in the manager's respective spreadsheet document.

Figure 10:
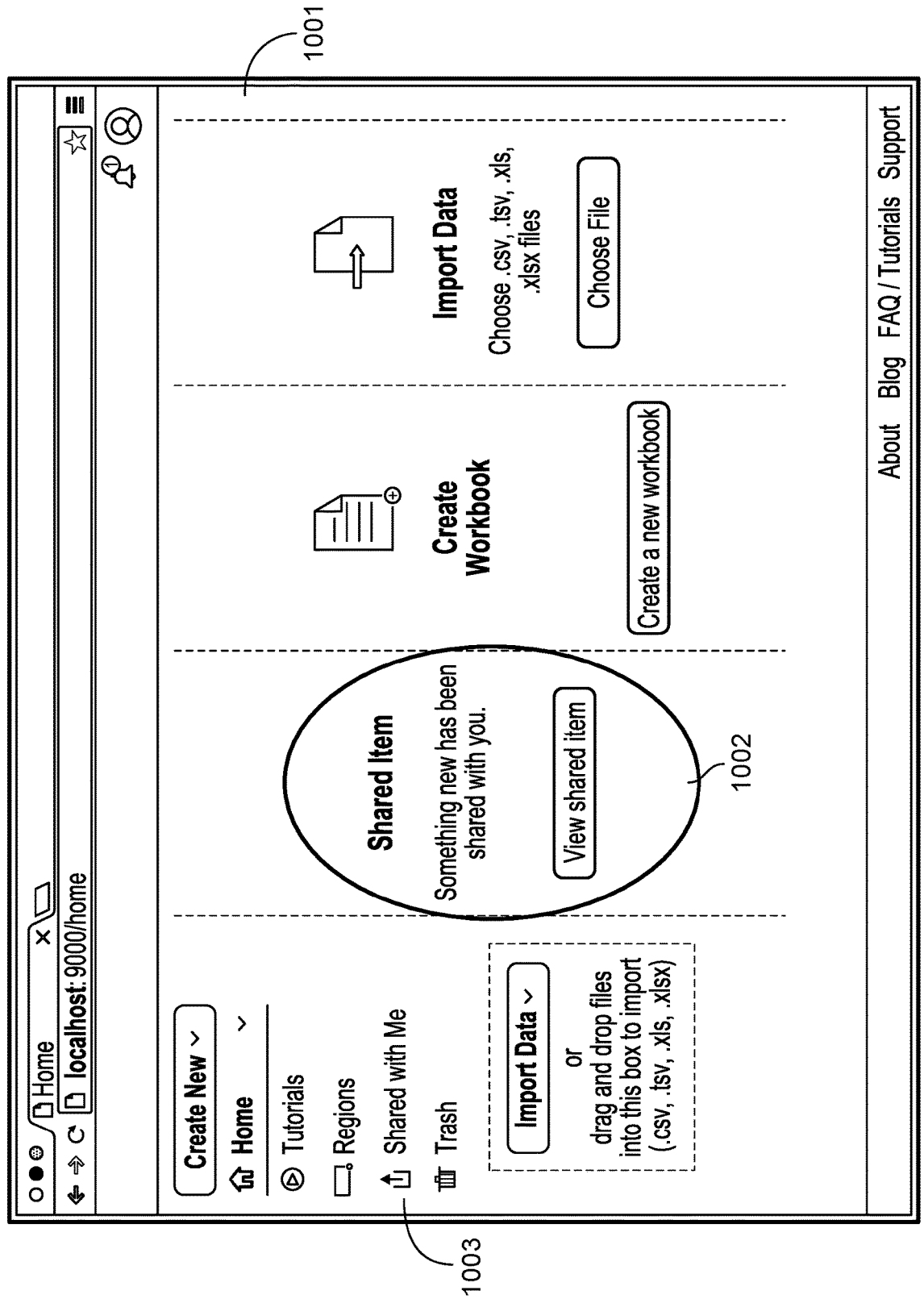
FIG. 10 is a diagram illustrating an embodiment of a display for a user interface for notifying a user that a region has been shared with the user.

FIG. 10 is a diagram illustrating an embodiment of a display for a user interface for notifying a user that a region has been shared with the user. In some embodiments, user interface window 1001 of FIG. 10 is shown to a user after indicating that a region is to be shared (e.g., using share action 405 of FIG. 4). In the example shown, user interface window 1001 includes shared items window 1002 that notifies a user of shared items (e.g., a shared region of cells). In some embodiments, shared items window 1002 includes a notification that new region(s) has/have been shared with the user. Selecting shared items window 1002 enables a user to inspect newly shared items. In some embodiments, user interface window 1001 is displayed when a user logs into his or her account. User interface window 1001 also includes Shared with Me menu item 1003. In some embodiments, Shared with Me menu item 1003 is displayed in a sidebar of user interface window 1001. Selecting the Shared with Me menu item 1003 enables a user to inspect the items shared with the user including newly shared and previously shared items. In various embodiments, the shared items comprise one or more of the following: a shared region, a shared workbook, a shared sheet, a shared object, a shared data source, a shared function, or any other appropriate shared item.

Figure 11:
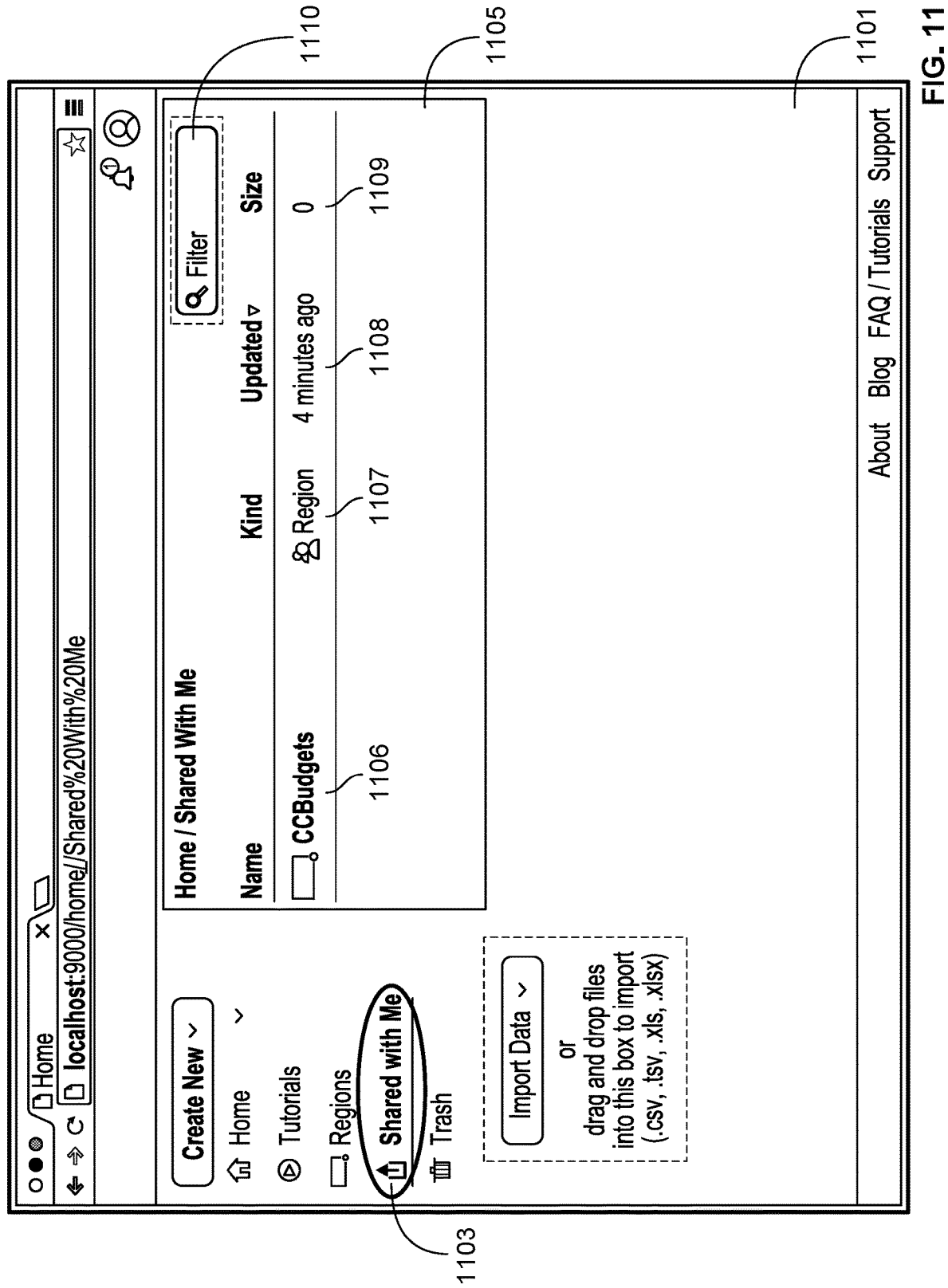
FIG. 11 is a diagram illustrating an embodiment of a display for a user interface for displaying shared regions.

FIG. 11 is a diagram illustrating an embodiment of a display for a user interface for displaying shared regions. In some embodiments, the Shared with Me menu item 1103 is the Shared with Me menu item 1003 of FIG. 10. In some embodiments, Shared With Me window 1105 is displayed in user interface window 1101 by selecting Shared with Me menu item 1103 or Shared with Me menu item 1003 of FIG. 10. In the example shown, user interface window 1101 includes Shared with Me menu item 1103 and Shared With Me window 1105. Shared With Me window 1105 displays a list or partial list of shared items that the current user has access permissions for. Shared With Me window 1105 displays details for shared items. For example, Shared With Me window 1105 displays share item name 1106, shared item kind 1107, shared item last updated time 1108, and shared item size 1109. In some embodiments, share item name 1106 includes a name identifying the shared item such as a region name. In some embodiments, share item name 1106 includes an icon corresponding to the kind of shared item—for example, an icon corresponding to a region. In various embodiments, different icons exist to differentiate between different shared item types—for example, there is a different icon for shared formulas, shared sheets, shared data sources, shared objects, or any other appropriate shared item. In the example shown, the current authenticated user has access to a region named CCBudgets, which is a shared region. The region was last updated 4 minutes ago and currently has a size of 0. In various embodiments, shared items include workbooks, sheets, formulas, data sources, objects, or any other appropriate type of item. In some embodiments, the different columns displayed for a shared item are selected to be sorted by category. In the example shown, the shared items are sorted by last update time. Shared With Me window 1105 includes shared items filter box 1110. Shared items filter box 1110 enables a user to filter the displayed shared items. In some embodiments, the number of shared items exceeds the number of items that can be displayed and only a subset of shared items is displayed. In some embodiments, the user is able to page through the shared items when the entire set of shared items is too many to display in a single page. Using shared items filter box 1110, the displayed shared items are able to be filtered using different properties corresponding to a shared item such as the name, author, last updated time, the time and date the item was shared, size, other users with shared access to the item, access permissions, and creation date.

Figure 12:
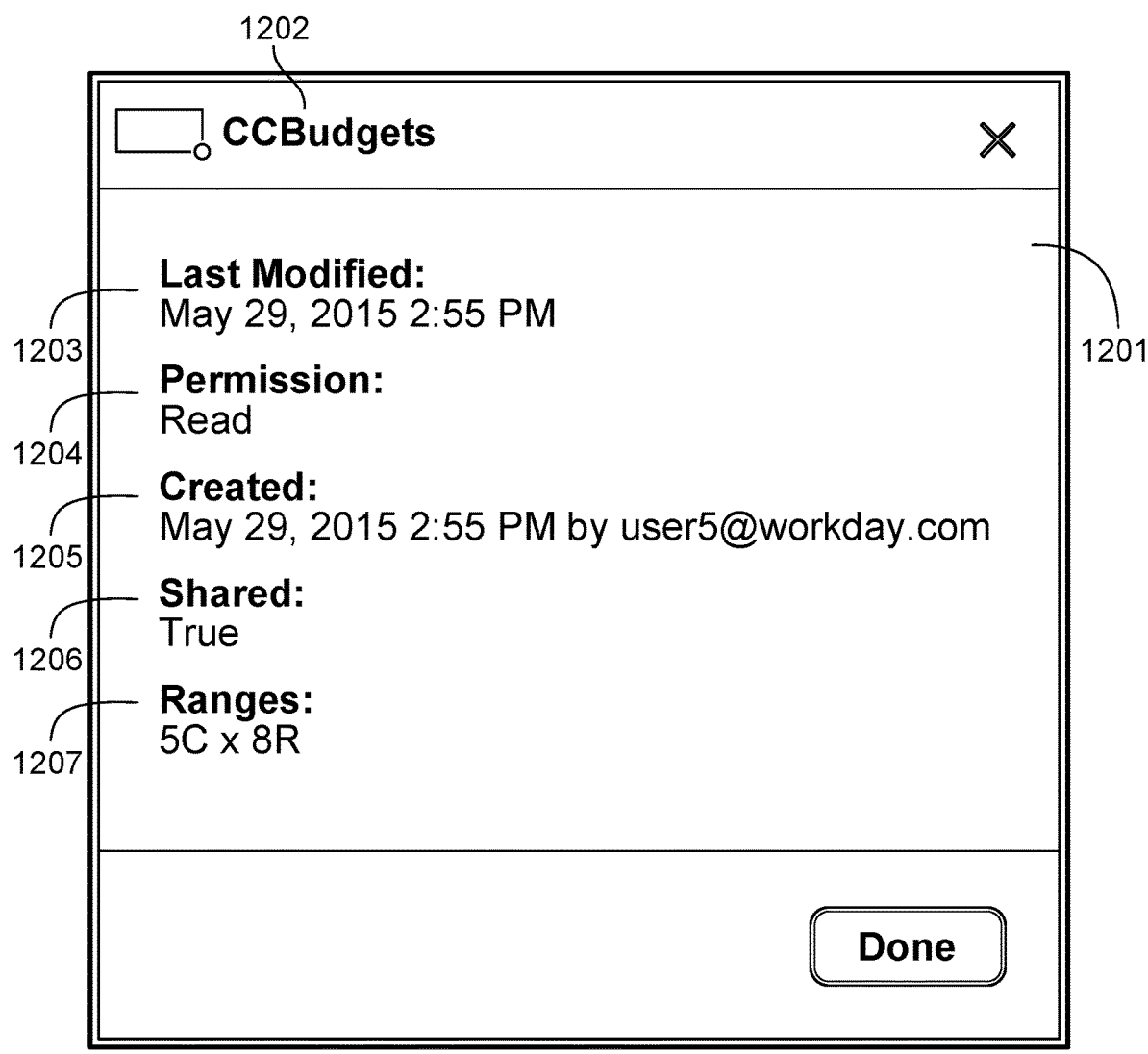
FIG. 12 is a diagram illustrating an embodiment of a display for a user interface for displaying details for a shared region.

FIG. 12 is a diagram illustrating an embodiment of a display for a user interface for displaying details for a shared region. In some embodiments, shared item details window 1201 is displayed by selecting a shared item from the Shared With Me window 1105 of FIG. 11, for example, by selecting share item name 1106 of FIG. 11. In some embodiments, shared item details window 1201 is displayed by selecting a shared item from the Shared With Me window 1105 of FIG. 11, for example, by right clicking to reveal an additional details action. In the example shown, shared item details window 1201 displays additional information associated with a particular shared item—for example, a shared region. Shared item name 1202 displays the name of the shared item (e.g., CCBudgets). Additional details include the last modified time 1203, access permissions 1204, creation details 1205, re-share permissions 1206, and share range size 1207. The details listed are specific to shared regions and may not exist for other share items, such as share range size 1207. Other shared items may include different details that are not specific to shared regions but rather specific for that kind of item. In the example shown, the shared region named CCBudgets was created May 29, 2015 at 2:55 PM. The current user has Read permission for the shared region. Other permissions include read/write permission. The shared region was created May 29, 2015 2:55 PM by user5@workday.com. The re-share permissions are enabled to allow the user to re-share the region with other users. The share region's size is 5C×8R, which corresponds to 5 columns by 8 rows. In some embodiments, shared item details window 1201 is displayed by first selecting a line corresponding to a shared item. An information button associated with the selected shared item is displayed. Selecting the information button displays shared item details window 1201 for the selected shared item.

Figure 13:
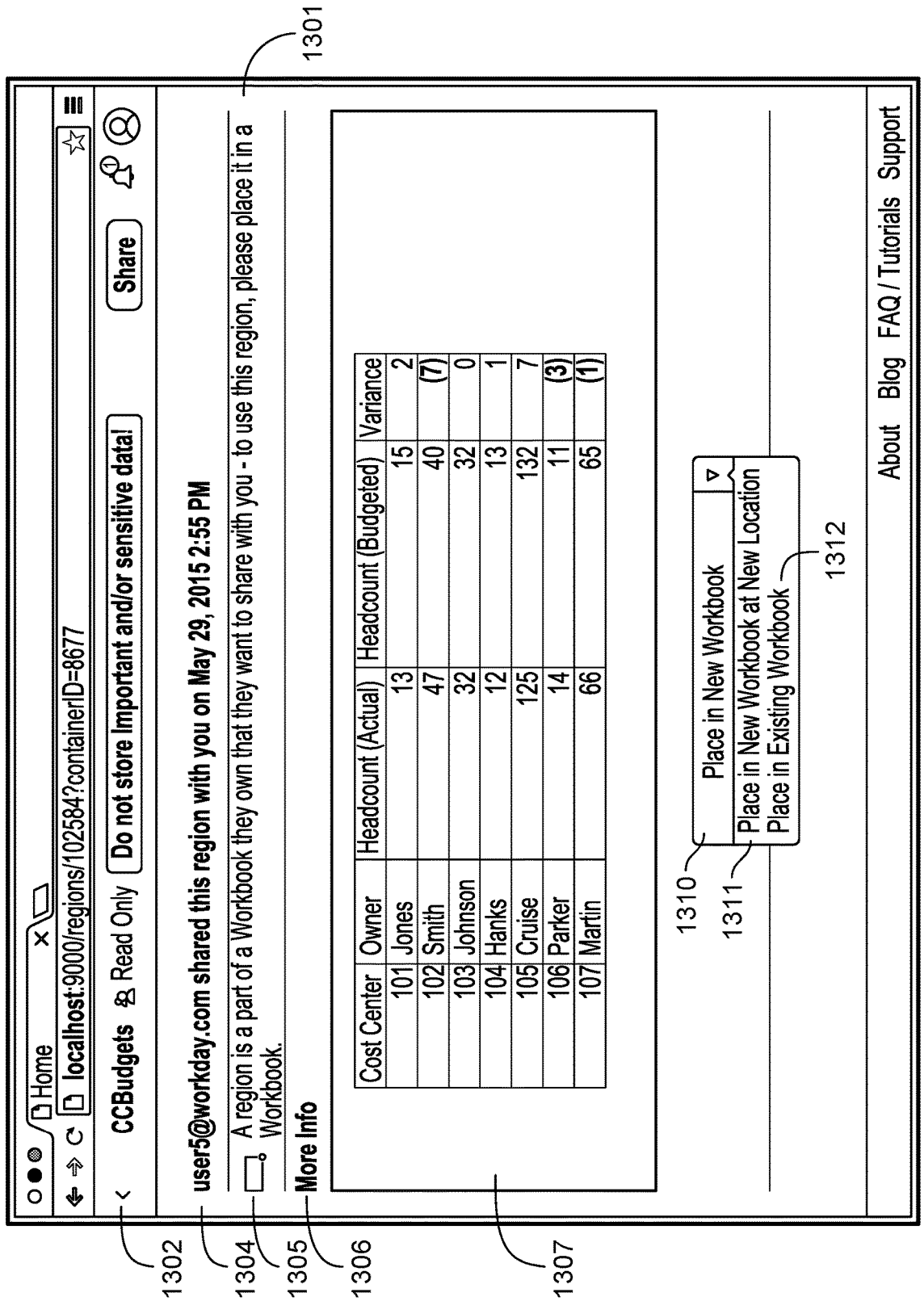
FIG. 13 is a diagram illustrating an embodiment of a display for a user interface for previewing a shared region.

FIG. 13 is a diagram illustrating an embodiment of a display for a user interface for previewing a shared region. In some embodiments, shared region preview window 1301 is displayed by selecting a shared item from the Shared With Me window 1105 of FIG. 11—for example, by selecting share item name 1106 of FIG. 11. In some embodiments, action item 1306 displays shared item details window 1201 of FIG. 12. In the example shown, shared region preview window 1301 includes a title bar 1302. Title bar 1302 includes back navigation icon, the shared region name, user access permissions display, user message window, a share button, notifications icon, and a user account icon to access user account functionality. Shared region preview window 1301 includes several windows, fields, and action items to display information related to the shared region. For example, field 1304 includes the original user that shared the region along with the date and time the region was shared. Field 1305 displays information related to the item share type. For example, field 1305 includes information that shared region CCBudgets is a region that has been shared and how to utilize the region. In some embodiments, a shared region is used by first placing it in a workbook. Action item 1306 labeled More info is able to be selected by a user to display additional details related to the shared region. Preview window 1307 is a user interface window that displays a preview of the data and values corresponding to the shared region. The user is able to view preview window 1307 to determine the context of the shared region, for example, the type and amount of data that is used by the shared region. In some embodiments, preview window 1307 is used by the user to help determine where to place the shared region. Place menu 1310 is a drop down menu that initiates the placement of the shared region into a workbook. Place menu 1310 includes two options. Menu item 1311 enables a user to place the shared region in a new workbook at a new location. Menu item 1312 enables a user to place the shared region in an existing workbook. When menu item 1311 is selected, the user is prompted to create a new workbook. When menu item 1312 is selected, the user is prompted to select an existing workbook.

FIG. 14 is a diagram illustrating an embodiment of a display for a user interface for placing a shared region in a workbook. In some embodiments, table 1401 is displayed after creating a new or selecting an existing workbook using menu items 1311 or 1312 of FIG. 13. In the example shown, table 1401 is a table of cells from a sheet of a workbook. A selected shared region is placed into table 1401 by selecting anchor cell 1402. Anchor cell 1402 is a cell in table 1401 that is selected by the user and defines the upper left corner of region 1403 where the shared region is placed. In some embodiments, the user selects anchor cell 1402 using a cursor, a touchpad, by entering the cell by typing, by selecting the cell using a column-row notation, or by highlighting the cell. In this example, the user selected cell C3 as the anchor cell and the shared region is placed in the table at region 1403.

In some embodiments, a placing policy exists that must be followed before a shared region can be placed in a table. For example, a placing policy requires that all cells in the target region must be blank before a shared region can be placed into the target region. In this example, a warning message is displayed to inform the user that the target region is incompatible with the shared region. In another example, a placing policy allows the existing values in the cells of the target region to be overridden. In yet another placing policy, it first shifts the cells that have values by inserting blank cells into the target region. In various embodiments, the blank cells are inserted as individual cells, entire rows, entire columns, a collection of cells, or in any other appropriate manner. In some embodiments, the placing policy is configured by a user or an administrator.

Figure 15:
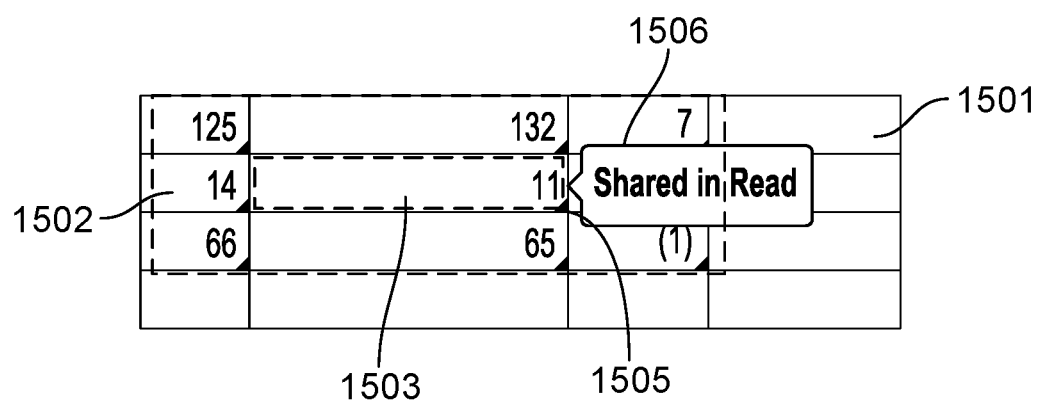
FIG. 15 is a diagram illustrating an embodiment of a display for a user interface for displaying details for a shared cell.

FIG. 15 is a diagram illustrating an embodiment of a display for a user interface for displaying details for a shared cell. In some embodiments, the information dialog 1506 is displayed when a cursor hovers over the corresponding shared cell or by activating the information dialog from a menu. In some embodiments, the information dialog 1506 is a tooltip. In some embodiments, a tooltip or infotip or a hint is a common graphical user interface element. It is used in conjunction with a cursor, usually a pointer. The user hovers the pointer over an item, without clicking it, and a tooltip appears—a small "hover box" with information about the item being hovered over. In the example shown, table 1501 is a table of cell in a sheet of a workbook. The region 1502 is a shared region that includes shared cells such as shared cell 1503. When a cell is a shared cell, the user interface client displays shared cell visual indicator 1505 identifying the cell as being shared. Shared cell visual indicator 1505 is a triangle indicator, sometimes referred to as a dog-ear, in the lower right corner of shared cell 1503. In some embodiments, shared cell visual indicator 1505 has an accent color to differentiate it from other visual indicators. In some embodiments, shared cell visual indicator 1505 is placed in a different corner of shared cell 1503 to differentiate it from other visual indicators. Information dialog 1506 displays information corresponding to a selected or highlighted cell, in this case shared cell 1503. Information dialog 1506 includes information related to the access permissions of the cell, including whether the cell is shared in read or in read/write mode.

Figures 16, 17:
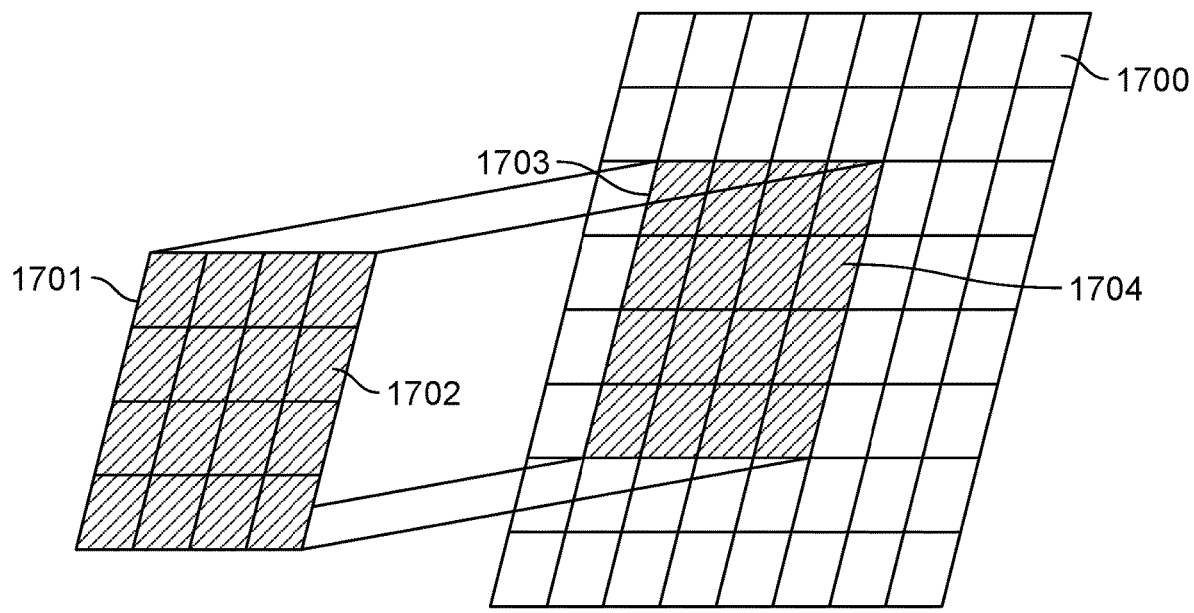
FIG. 16 is a diagram illustrating an embodiment of a display for a user access message.
FIG. 17 is a diagram illustrating an embodiment of a concept of a viewport associated with a shared region of cells.

FIG. 16 is a diagram illustrating an embodiment of a display for a user access message. In the example shown, access message 1601 is displayed in the event that a user attempts to change the value of a read-only shared cell. Access message 1601 notifies the user that access has been denied. In some embodiments, the message is dismissed by selecting a dismiss action.

In some embodiments, a user access message is displayed in place of the value or formula corresponding to a shared cell. In various embodiments, the user access message is displayed in either the cell location, the formula location, or any other appropriate location. As an example, a user places a shared cell or shared region of cells in a workbook. In the event that the user's access to the shared region is later removed, the user denial of access message (e.g., error message #ACCESS! or #ERROR!—Access to shared region has been revoked) is then displayed in cells that reference the shared region. Since the user no longer has read access to the shared cells, the user is displayed a user access error message in place of the value or formula for the shared cells. In various embodiments, similar user access messages are displayed in the cell, formula location, or any other appropriate location corresponding to different access circumstances. In some embodiments, the user access error message is only displayed in the cell location of the shared cell and the formula location displays the address of the referenced shared cell.

In some embodiments, the user interface data to create user interfaces including exemplary user interfaces of FIGS. 10-15 is sent from application server 111 of FIG. 1 to a user interface client running on user systems 101, 103, 105, and 106 of FIG. 1. In FIGS. 10-15, the exemplary user interface client is a web browser that interfaces with an application server using a SaaS platform.

In some embodiments, access permissions for shared regions are determined dynamically. For example, when a shared cell is accessed, the permissions corresponding to read and read/write access are dynamically calculated. This enables any user with administration privileges to modify access to a shared region—for example, by removing read-access, and for the modification to take place immediately. In this manner, any user who previously had read-access to the shared region is no longer able to view the shared region. In some embodiments, the determination of access permissions is determined by an application running on an application server 111 of FIG. 1. In some embodiments, the access permissions are stored in an external hosted location such as external storage 115 of FIG. 1.

FIG. 17 is a diagram illustrating an embodiment of a concept of a viewport associated with a shared region of cells. In various embodiments, a viewport comprises a shared set or subset of spreadsheet document(s)—for example, a viewport comprises one or more of the following: one or more shared cells, one or more shared adjacent cells, one or more shared rectangular regions of cells, one or more shared non-rectangular regions of cells, one or more shared worksheets, one or more shared workbooks, or any other appropriate shared areas of spreadsheets. In the example shown, table 1700 comprises a table of cells of a sheet in a workbook. The user of table 1700 has been granted access to shared region 1701. Shared region 1701 includes a set of shared cells including shared cell 1702. In this example, the size of the shared region is 4×4 cells. The user has placed shared region 1701 into table 1700 at region 1703. The cells in region 1703 map to the cells in shared region 1701. Cell 1704 is a shared cell that maps to shared cell 1702. In the event that the user has read access to shared region 1701, any changes to values of the cells in shared region 1701 are reflected in the shared cells in region 1703. For example, in the event that the value in shared cell 1702 changes from a first value to a second value (e.g., 10 to 30), the value in cell 1704 will also change from the first value to the second value (e.g., 10 to 30). In this example, the original creator of shared region 1701 has write permission and changes the value so that the user of table 1700 also sees the modification. Similarly, in the event that the user of table 1700 has write permission for the share region 1701, any changes to the cells in region 1703 will be reflected in shared region 1701. For example, in the event that the user of table 1700 changes the value in shared cell 1704 from a third value to a fourth value (e.g., 30 to 50), the value in cell 1702 will also change from the third value to the fourth value (e.g., 30 to 50). However, in the event that a user does not have write permissions, any attempt to write to cells in region 1703 is denied. In some embodiments, a user access message is displayed (e.g., a denial of access message).

Figure 18:
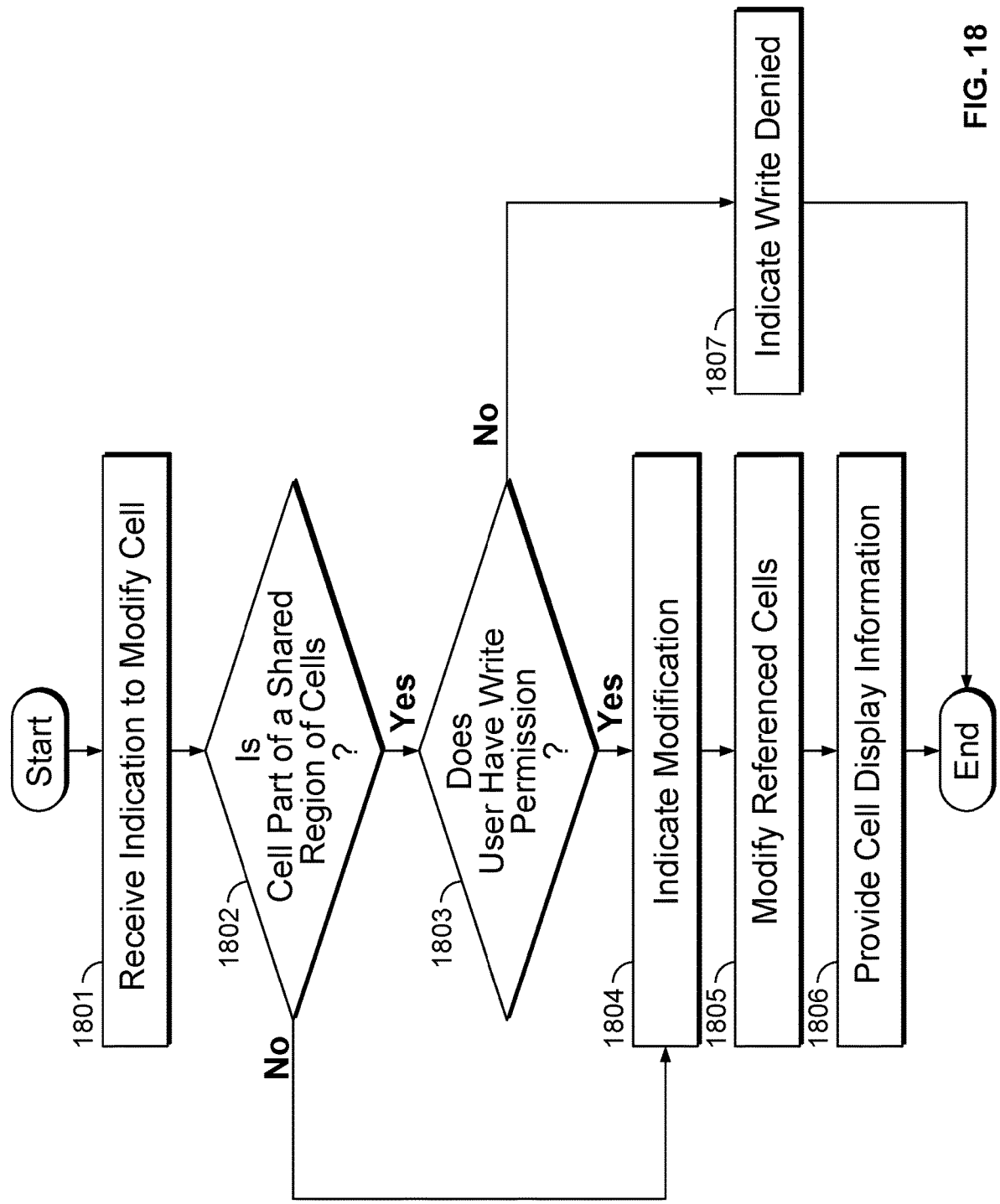
FIG. 18 is a flow diagram illustrating an embodiment of a process for updating changes to a cell.

FIG. 18 is a flow diagram illustrating an embodiment of a process for updating changes to a cell. In some embodiments, the process is executed by an application running on an application server 111 of FIG. 1. In the example shown, in 1801, an indication to modify a cell is received. For example, a user indicates to modify a cell of a document (e.g., a spreadsheet document) by modifying a value or formula in a cell. In 1802, it is determined whether the cell is a part of a shared region of cells. For example, the system for each shared region determines whether the cell belongs to the shared region. In the event that the cell is not part of a shared region, control passes to 1804. In the event that the cell is part of a shared region, in 1803 it is determined whether the user has write permission. For example, the write permission of the cell is determined by examining access descriptors associated with the user of the cell (e.g., a user viewing or executing a formula in the cell). The cell is a shared cell and has a corresponding pointer formula. The pointer formula indicates a link between the cell and an other cell of another document that is the source of the value, the data, or the formula that is shared from the other cell to the cell. In some embodiments, each user has a corresponding set of user access descriptors. In the event that the user has write permission then, in 1804, a modification is indicated. For example, an indication is created to modify a value, a data, or content(s) of a location in a database storage location referenced by the pointer formula associated with the shared cell. The location in the database storage location is associated with the value corresponding to the shared cell. For a shared cell, the formula for the cell includes a pointer formula that references and includes an address for a cell outside the workbook. In some embodiments, the location in the database storage location relies on an external storage. In 1805, the referenced cells are modified. For example, the change to the value of the cell is written to a location in the database storage. Cells that reference the shared cell receive the new value for the shared cell. In some embodiments, the referenced cells exist in a different document and are owned by a different user. In some embodiments, the referenced cells are identified by using a dependency graph (e.g., a directed graph representing a set of cells with directional relations between each other). For a particular cell, a dependency graph maintains links between all cells and formulas that depend on the cell. Using the modified cell as an input, traversing the dependency graph identifies every cell (or formula) that depends on the modified cell. In some embodiments, once a shared cell is modified, users sharing the cell may receive a notification, such as an alert, an email, a message via a user client interface, notifying the user of the change. Using the techniques disclosed herein, edits to a cell of a shared region in one document are reflected in a cell of another document that shares the same shared region.

In 1806, display information is provided for the cell. For example, display information for the user is provided by the system to a user system to display the modified value. The display information is also provided to other shared users to display the modified value, if appropriate. In 1803, in the event that the user does not have write permission, in 1807 it is indicated that the write is denied. For example, a user access message (e.g., a denial of access message) is displayed informing the user that the write was denied for the cell.

In some embodiments, a pointer formula is used to reference a cell outside the current workbook. In some embodiments, the pointer formula has the following format:
=object-id!cell-address
where object-id comprises a unique object identifier for the shared region and cell-address comprises the address of the shared cell. In some embodiments, object-id is a unique identifier for the workbook and sheet that contains the shared cell at the cell location cell-address. The pointer formula enables the system to recognize that a cell refers to another cell in a different table, sheet, or workbook.

In some embodiments, a process maintains security for confidential information when a user shares a region. For example, a formula refers to a sheet with a name that reveals confidential information that the sharer does not intend to disclose (e.g., a sheet is named ToBeFired and lists employees who are to be terminated). A user may want to share the names of the employees in the sheet ToBeFired but does not want to disclose the context used to create the list, which would be revealed in the event that the name of the sheet is disclosed. Formula templates are used to ensure that confidential information is not leaked. In the event that the user does not have read access to the sheet name, then the canonical name is replaced with an opaque identifier when displaying a formula that references a cell that is not shared.

FIG. 19 is a diagram illustrating an embodiment of display for a user interface for displaying an opaque identifier for a referenced cell. In the example shown, a user has placed shared region 1901 into a workbook. Shared region 1901 includes shared cells such as shared cell 1902. Shared cell 1902 has a formula 1910 that is displayed when shared cell 1902 is selected. Dialog 1903 shows that shared cell 1902 is shared with read/write permissions. This indicates that the user is able to both view and modify the contents of shared cell 1902. In this example, the user does not have read access to the workbook or sheets from which the cells referenced in formula 1910 originate. Formula 1910 displays an opaque identifier (e.g., @102405) in place of the canonical name of the workbook and sheet from which the referenced cells (e.g., D2 and C2) originate. In some embodiments, the opaque identifier comprises a unique object identifier.

FIG. 20 is a diagram illustrating an embodiment of a display for a user interface for displaying a canonical name of a shared cell. In the example shown, a user has placed shared region 2001 into a workbook. Shared region 2001 includes shared cells such as shared cell 2002. Shared cell 2002 has a formula 2010 that is displayed when shared cell 2002 is selected. Dialog 2003 shows that shared cell 2002 is shared with read/write permissions. Dialog 2003 indicates that the user is able to both view and modify the contents of shared cell 2002. Shared cell 2002 contains a formula that references two cells outside the current workbook. In the example shown, the user has read access to the workbook and sheets from which the cells referenced in formula 2010 originate. The two cells are cells D8 and C8 of the workbook Budget and sheet Sheet1. Because the user has read access to both workbook Budget and sheet Sheet1, formula 2010 for shared cell 2002 displays the canonical name for the workbook (e.g., Budget) and sheet (e.g., Sheet1) of the referenced cells.

In some embodiments, in the event that a user shares a region, the cells in the shared region refer to another cell, either inside or outside of the shared region. Subject to the security policy, including access permissions to workbook and sheet names described herein, formula template reconstitution is used to ensure that the correct path to the original cell is shown. In some embodiments, displaying a formula for a shared cell that references another cell relies on formula template reconstitution to show the original path of the referenced cell.

FIG. 21 is a diagram illustrating embodiments of formula template reconstitution. In the example shown, two regions from two different workbooks and sheets are depicted. A user (e.g., user S) owns a sheet and initiates sharing. User S shares a region (e.g., region RS) with another user (e.g., user A). Region RS exists in a workbook (e.g., a workbook WS) and on a sheet (e.g., sheet S1). User A places shared region RS into another workbook (e.g., workbook WA) on another sheet (e.g., sheet S2). For ease of reference, the region placed by User A in workbook WA sheet S2 is referred to as RA. Region RS is defined as WS!S1!A9:A12, which includes cells A9-A12 of workbook WS sheet S1. Shared region RS is placed by User A into workbook WA sheet S2 cells D8:D11. In this manner, WA!S2:D8 maps to WS!S1!A9; WA!S2:D9 maps to WS!S1!A10; WA!S2:D10 maps to WS!S1!A11; and WA!S2:D11 maps to WS!S1!A12.

In the example shown, shared cell 2101 of workbook WS sheet S1 references a cell, B10, that is outside shared region RS but in workbook WS sheet S1. In user A's workbook WA sheet S2, shared cell 2111 displays the formula='@98316'!B10. The identifier @98316 is a reference to workbook WS sheet S1. The formula for user A's shared cell 2111 references a cell outside the shared region but in workbook WS sheet S1. In this example, user A does not have read permission for workbook WS sheet S1. In some embodiments, if user A had read permission for workbook WS sheet S1, the formula for shared cell 2111 would display the canonical names WS and S1 instead of an opaque identifier. Using the canonical names, the formula displayed is =WS!S1!B10.

In the example shown, shared cell 2102 of workbook WS sheet S1 references cells A9 and A11 that are within the shared region RA. In user A's workbook WA sheet S2, shared cell 2112 displays the formula=Sum ('@98316'!A9: '@98316'!A11). The identifier @98316 is a reference to workbook WS sheet S1. In this manner, the formula for user A's shared cell 2112 references the addresses of shared cells in workbook WS sheet S1.

In some embodiments, formula template reconstitution is not used when a cell contains a value instead of a formula. Shared cell 2105 corresponds to user A's shared cell 2115. Shared cell 2105 contains a value, 10 and not a formula. Since shared cell 2105 does not rely on a formula, user A's shared cell 2115 displays the value 10 and does not rely on formula template reconstitution.

FIG. 22 is a table illustrating an embodiment of formula template addressing modes. In the example shown, different address modes are used during formula template reconstitution. The address modes include sheet relative addressing, workbook relative path addressing, and absolute path addressing. The use of different address modes enables concise displaying of formulas for both shared and non-shared cells. For example, a cell that references another cell in the same sheet uses sheet relative addressing since the referenced cell resolves to a local sheet. With shared regions, the referenced cell typically uses absolute path addressing since the referenced cell is typically in a different workbook and sheet. Absolute path addressing enables identifying an object or cell by starting at the user's root path and allows addressing of other workbooks and extra-workbook objects. In the event that formula templates are reconstituted, the process takes into account the user who is viewing the formula, the sheet through which the formula is accessed, and the sheet on which the formula actually resides. For shared cells, the formula is reconstituted by taking into account the sheet through which the formula is being accessed.

Figure 23:
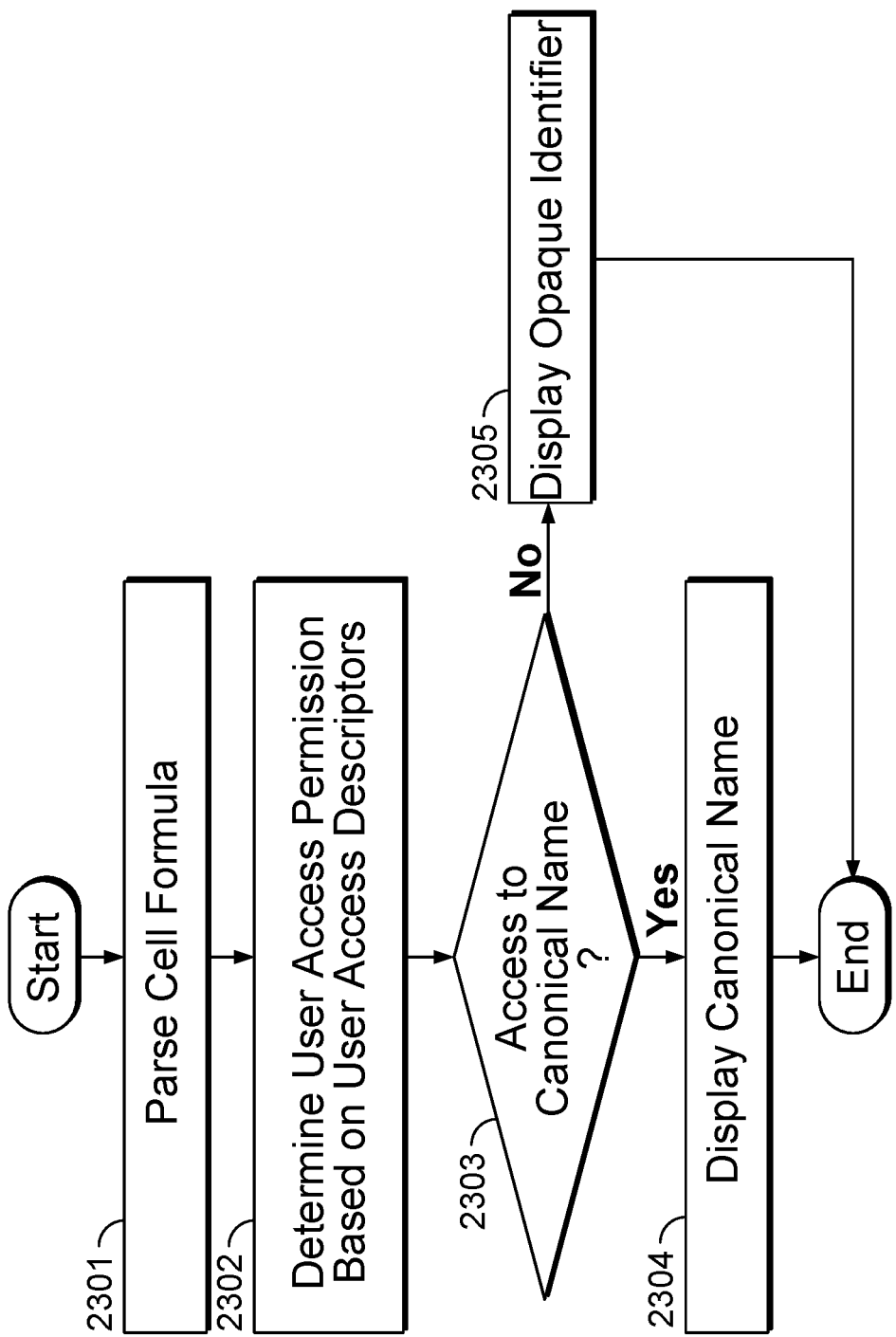
FIG. 23 is a flow diagram illustrating an embodiment of a process for evaluating formula templates.

FIG. 23 is a flow diagram illustrating an embodiment of a process for evaluating formula templates. In some embodiments, the process is executed by an application running on an application server 111 of FIG. 1. In the example shown, in 2301, a cell formula is parsed. For example, the formula of a shared cell of a shared region is parsed and contains a reference to another cell. In various embodiments, the referenced cell is within or outside the shared region. The shared cell is part of a spreadsheet document associated with a user having a set of user access descriptors. In 2302, user access permission is determined based on user access descriptors. For example, a determination is made based on the user's set of user access descriptors whether the user has access to one or more canonical names referenced in the formula. The user access descriptors are evaluated to determine whether the user has access to the canonical names of the workbook and sheet where the referenced cell originates. In 2303, it is determined whether there is access to the canonical name. In the event that there is access to the canonical name, then in 2304 the canonical name is used in the event that the referenced cell of the formula is displayed. In the event that there is not access to the canonical name, then in 2305 an opaque identifier is displayed. For example, an opaque identifier is used instead in the event that the referenced cell of the formula is displayed. In some embodiments, the opaque identifier is a unique identifier for a sheet within a workbook and when used with the cell column and row, the combination uniquely identifies the shared cell. In various embodiments, the formula includes a reference to a user-defined function, a named data source, a named object, or any other appropriate information. In the event that the user has access to the canonical names, the formula displays the canonical names associated with the reference. In the event that the user does not have access, the canonical names are replaced with an opaque identifier. For example, the canonical name of the function name is replaced with an opaque identifier that uniquely identifies the function.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for spreadsheet region and cell sharing using formula templates comprising:
   an interface to receive an indication to display a formula of a shared cell, wherein the formula is of a formula cell shared with the shared cell, wherein the shared cell is associated with a share user having a set of user access descriptors, wherein the indication to display the formula of the shared cell comprises selecting the shared cell; and
   a processor to:
      in response to the indication to display the formula of the shared cell, cause displaying of the formula of the shared cell, wherein the causing of the displaying of the formula of the shared cell comprises to:
         parse the formula to identify one or more references to other cells;
         determine, based at least in part on the set of user access descriptors, whether the share user has access to a canonical name of one or more canonical names associated with the one or more references to the other cells, wherein the canonical name of the one or more canonical names comprises a workbook and a sheet name;
         in response to a share determination that the share user has access to the canonical name of the one or more canonical names, provide a first display formula as display information for the formula, wherein the first display formula comprises the canonical name of the one or more canonical names;
         in response to a non-share determination that the share user does not have access to the canonical name of the one or more canonical names:
            replace the canonical name of the one or more canonical names in the first display formula with an opaque identifier corresponding to the canonical name of the one or more canonical names to obtain a second display formula, wherein the replacing of the canonical name comprises to:
               look up, using a look up table, the opaque identifier based on a canonical identifier associated with the shared cell, wherein the look up table stores a mapping between opaque identifiers and canonical identifiers each canonical identifier in the look up table being unique; and
            provide the second display formula as the display information for the formula; and
         cause a display to display the display information for the formula of the shared cell.

2. The system of claim 1, wherein the formula cell comprises a cell of a first document and the shared cell is a cell of a second document, wherein the first document is different from the second document.

3. The system of claim 1, wherein the opaque identifier uniquely identifies the formula cell.

4. The system of claim 1, wherein the formula cell is part of a shared region that includes the shared cell.

5. The system of claim 1, wherein the formula cell is not part of a shared region that includes the shared cell.

6. The system of claim 1, wherein the shared cell and the formula cell are cells of a first document, wherein the processor is further to determine that the formula cell references a second document cell in a second document.

7. The system of claim 6, wherein the second document is different from the first document.

8. The system of claim 6, wherein the second document is associated with an other user.

9. The system of claim 8, wherein the other user is different from the share user.

10. The system of claim 6, wherein the formula cell references a location in a database storage location associated with the second document cell in the second document.

11. The system of claim 1, wherein the formula cell includes a user defined function.

12. The system of claim 1, wherein the formula cell includes a named data source.

13. The system of claim 1, wherein the formula cell includes a named object.

14. The system of claim 1, wherein the indication to display the formula of the shared cell is a first indication, wherein the interface is further to receive a second indication, the second indication being an access permission indication to display access permissions of the shared cell.

15. The system of claim 14, wherein the second indication comprises hovering a pointer over the shared cell.

16. The system of claim 1, wherein the canonical name comprises a function name.

17. A method for spreadsheet region and cell sharing using formula templates comprising:
   receiving an indication to display a formula of a shared cell, wherein the formula is of a formula cell shared with the shared cell, wherein the shared cell is associated with a share user having a set of user access descriptors, wherein the indication to display the formula of the shared cell comprises selecting the shared cell;
   in response to the indication to display the formula of the shared cell, cause displaying of the formula of the shared cell, wherein the causing of the displaying of the formula of the shared cell comprises:
      parsing, using a processor, the formula to identify one or more references to other cells;
      determining, based at least in part on the set of user access descriptors, whether the share user has access to a canonical name of one or more canonical names associated with the one or more references to the other cells, wherein the canonical name of the one or more canonical names comprises a workbook and a sheet name;
      in response to a share determination that the share user has access to the canonical name of the one or more canonical names, providing a first display formula as display information for the formula, wherein the first display formula comprises the canonical name of the one or more canonical names;
      in response to a non-share determination that the share user does not have access to the canonical name of the one or more canonical names:
         replacing the canonical name of the one or more canonical names in the first display formula with an opaque identifier corresponding to the canonical name of the one or more canonical names to obtain a second display formula, wherein the replacing of the canonical name comprises:

looking up, using a look up table, the opaque identifier based on a canonical identifier associated with the shared cell, wherein the look up table stores a mapping between opaque identifiers and canonical identifiers, each canonical identifier in the look up table being unique; and providing the second display formula as the display information for the formula; and causing a display to display the display information for the formula of the shared cell.

18. A computer program product for spreadsheet region and cell sharing using formula templates, the computer program product being embodied in a non-transitory computer readable storage medium and comprising computer instructions for:

receiving an indication to display a formula of a shared cell, wherein the formula is of a formula cell shared with the shared cell, wherein the shared cell is associated with a share user having a set of user access descriptors, wherein the indication to display the formula of the shared cell comprises selecting the shared cell;

in response to the indication to display the formula of the shared cell, cause displaying of the formula of the shared cell, wherein the causing of the displaying of the formula of the shared cell comprises:

parsing, using a processor, the formula to identify one or more references to other cells;

determining, based at least in part on the set of user access descriptors, whether the share user has access to a canonical name of one or more canonical names associated with the one or more references to the other cells, wherein the canonical name of the one or more canonical names comprises a workbook and a sheet name;

in response to a share determination that the share user has access to the canonical name of the one or more canonical names, providing a first display formula as display information for the formula, wherein the first display formula comprises the canonical name of the one or more canonical names;

in response to a non-share determination that the share user does not have access to the canonical name of the one or more canonical names:

replacing the canonical name of the one or more canonical names in the first display formula with an opaque identifier corresponding to the canonical name of the one or more canonical names to obtain a second display formula, wherein the replacing of the canonical name comprises:

looking up, using a look up table, the opaque identifier based on a canonical identifier associated with the shared cell, wherein the look up table stores a mapping between opaque identifiers and canonical identifiers, each canonical identifier in the look up table being unique; and providing the second display formula as the display information for the formula; and causing a display to display the display information for the formula of the shared cell.

* * * * *